(12) United States Patent
Ito et al.

(10) Patent No.: US 8,610,388 B2
(45) Date of Patent: Dec. 17, 2013

(54) CONTROL APPARATUS AND CONTROL METHOD FOR ELECTRIC ROTATING MACHINE

(75) Inventors: Masato Ito, Tokyo (JP); Yoshihiko Kimpara, Tokyo (JP); Masanori Tanimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 341 days.

(21) Appl. No.: 13/203,069

(22) PCT Filed: Mar. 25, 2009

(86) PCT No.: PCT/JP2009/001320
§ 371 (c)(1),
(2), (4) Date: Aug. 24, 2011

(87) PCT Pub. No.: WO2010/109520
PCT Pub. Date: Sep. 30, 2010

(65) Prior Publication Data
US 2011/0304290 A1    Dec. 15, 2011

(51) Int. Cl.
    *H02K 29/06*    (2006.01)
(52) U.S. Cl.
    USPC ............. 318/400.32; 318/400.14; 318/400.23
(58) Field of Classification Search
    USPC .......... 318/400.32, 400.14, 400.23, 721, 727
    See application file for complete search history.

(56) References Cited

U.S. PATENT DOCUMENTS

| | | | |
|---|---|---|---|
| 6,958,589 B2 | 10/2005 | Kawaji et al. | |
| 7,084,603 B2 | 8/2006 | Taguchi et al. | |
| 2010/0194319 A1 | 8/2010 | Ito et al. | |
| 2013/0069572 A1* | 3/2013 | Maekawa | 318/400.14 |

FOREIGN PATENT DOCUMENTS

| | | |
|---|---|---|
| JP | 2000 102300 | 4/2000 |
| JP | 2001 69799 | 3/2001 |
| JP | 3 312 472 | 5/2002 |
| JP | 2004 320985 | 11/2004 |
| JP | 2004 343833 | 12/2004 |
| JP | 2006 109589 | 4/2006 |

OTHER PUBLICATIONS

U.S. Appl. No. 13/201,228, filed Aug. 12, 2011, Ito, et al.
U.S. Appl. No. 13/255,738, filed Sep. 9, 2011, Kimpara, et al.
Korean Office Action issued Nov. 2, 2012 in patent Application No. 10-2011-7022311 with Partial English Translation.

(Continued)

*Primary Examiner* — Karen Masih
(74) *Attorney, Agent, or Firm* — Oblon, Spivak, McClelland, Maier & Neustadt, L.L.P.

(57) ABSTRACT

A controller outputting voltage instructions for drive control of an electric rotating machine adds, by using adders, position estimation voltage instructions for estimating the rotor position generated by a position estimation voltage generator, to drive voltage instructions, and outputs the resultant signals as voltage instructions. A position estimation device includes current extractors for extracting position estimation currents having the same frequency components as that of the position estimation voltage instructions, from electric rotating machine currents detected by a current detector, a position estimation current amplitude calculation section for calculating position estimation current amplitudes from the position estimation currents; and an estimation position calculation unit for calculating an estimated position of the electric rotating machine, based on the position estimation current amplitudes. The position estimation current amplitude calculation section calculates the position estimation current amplitudes, based on an autocorrelation obtained by squaring the position estimation currents.

8 Claims, 12 Drawing Sheets

(56) References Cited

OTHER PUBLICATIONS

Ide, et al., "Saliency-based Sensorless Drive of Adequate Designed IPM Motor for Robot Vehicle Application," PCC-NAGOYA, pp. 1126-1133 (2007).

International Search Report issued Jun. 16, 2009 in PCT/JP09/01320 filed Mar. 25, 2009.

Office Action issued May 21, 2013 in Korean Application No. 10-2011-7022311 (With English Translation).

Gung Chul-Ho, et al., "Signal and System", Paju: Saengneung Publisher, rev. ed., $5^{th}$ printing, Aug. 1, 2007, p. 28 (With English Translation).

\* cited by examiner

CONTROL APPARATUS AND CONTROL METHOD FOR ELECTRIC ROTATING MACHINE

TECHNICAL FIELD

The present invention relates to a control apparatus and a control method, for an electric rotating machine such as an induction machine or a synchronous machine, that are capable of obtaining rotor position information without using a rotational position sensor, and performing drive control for the electric rotating machine.

BACKGROUND ART

In order to accurately control the rotational operation of an electric rotating machine, rotor position information of the electric rotating machine and information about a current flowing in the electric rotating machine are needed. Here, conventionally, the rotor position information is obtained by additionally attaching a rotational position sensor to the electric rotating machine. However, the additional provision of the rotational position sensor has a significant disadvantage in view of cost reduction, space reduction, improvement of reliability. Therefore, change from rotational position sensor style to sensorless style has been required.

Examples of control methods for changing the electric rotating machine from rotational position sensor style to sensorless style include a method of estimating the position of the rotor of the electric rotating machine mainly from an inductive voltage of the electric rotating machine, and a method of estimating the position of the rotor of the electric rotating machine by using saliency.

The inductive voltage which is used in the former method has a characteristic that the magnitude thereof is proportional to the speed of the electric rotating machine. Therefore, at a zero speed or a low speed, the inductive voltage decreases and an S/N ratio is deteriorated. As a result, it becomes difficult to accurately estimate the position of the rotor of the electric rotating machine.

On the other hand, in the latter method which uses saliency, in order to detect the saliency (positional dependence of inductance) of the electric rotating machine, a high-frequency voltage having a frequency different from a drive frequency of the electric rotating machine is applied to the electric rotating machine, a high-frequency current flowing in the electric rotating machine along with the application of the high-frequency voltage is detected, and the position of the electric rotating machine is estimated by using the fact that the magnitude of the high-frequency current varies depending on the position of the electric rotating machine owing to the saliency of the electric rotating machine.

Thus, the method using saliency has an advantage that the position of the rotor of the electric rotating machine can be estimated irrespective of the speed of the electric rotating machine, though a position estimation signal for estimating the position of the rotor of the electric rotating machine needs to be inputted to the electric rotating machine. Therefore, especially at a zero speed or a low speed, a position sensorless control method using saliency is used.

Conventionally, for example, techniques disclosed in Non-Patent Literature 1 and Patent Literature 1 shown below have been proposed as methods of estimating the position of the rotor of the electric rotating machine by using saliency.

That is, a conventional position estimation method disclosed in Non-Patent Literature 1 estimates the position by applying a high-frequency voltage to a γ-axis which is a given control axis. That is, a current flowing in the electric rotating machine owing to application of a high-frequency voltage to the γ-axis, which current has the same frequency component as that of the high-frequency voltage, is converted into a current idm on a dm-axis which lags by 45 degrees from the γ-axis, and a current iqm on a qm-axis which leads by 45 degrees from the γ-axis. Then, magnitudes Idm and Iqm of the currents idm and iqm are calculated by using Fourier transform, and proportional-integral control (PI control) is performed such that the magnitudes Idm and Iqm become equal to each other, whereby the position of the electric rotating machine is indirectly estimated.

Meanwhile, in the conventional technique disclosed in Patent Literature 1, in order to reduce noise caused by a voltage or a current having a frequency higher than a fundamental frequency applied to the electric rotating machine for estimating the position of the electric rotating machine, the frequency of the voltage or the current applied to the electric rotating machine, which frequency is higher than the fundamental frequency, is set to be random.

NON-PATENT LITERATURE 1: K. Ide, "Saliency-based Sensorless Drive of Adequate Designed IPM Motor for Robot Vehicle Application", PCC-Nagoya, 2007, pp. 1126-1133

PATENT LITERATURE 1: Japanese Laid-Open Patent Publication No. 2004-343833

DISCLOSURE OF THE INVENTION

Problems to be Solved by the Invention

In the conventional technique disclosed in Non-Patent Literature 1, Fourier transform is used for calculating the magnitudes of currents idm and iqm. In Fourier transform, a sine function sin ωht and a cosine function cos ωht having the same angular frequency ωh as that of the high-frequency voltage applied to the γ-axis need to be prepared. Therefore, additional calculation by a microcomputer (hereinafter, referred to as a microcomputer) and an additional memory of the microcomputer are needed for preparing the functions sin ωht and cos ωht. In some cases, this results in increase of the cost of the microcomputer, which is not desirable for making products.

Meanwhile, in the conventional technique disclosed in Patent Literature 1, in order to reduce noise caused by the voltage or the current having a frequency higher than a fundamental frequency applied to the electric rotating machine for estimating the position of the electric rotating machine, the frequency of the voltage or the current applied to the electric rotating machine, which frequency is higher than the fundamental frequency, is set to be random. However, a specific position estimation method is not disclosed.

Here, it is assumed to adopt, in the technique of Patent Literature 1, a known technique in which: a high-frequency current or a high-frequency voltage obtained by application of a voltage or a current having a frequency higher than a fundamental frequency to the electric rotating machine is detected; and the position of the electric rotating machine is estimated by using the fact that the magnitudes (amplitudes) of the high-frequency current and the high-frequency voltage depend on the position of the electric rotating machine. Normally, in calculation of the magnitude of the high-frequency current or the high-frequency voltage which has a frequency higher than the fundamental frequency by using Fourier transform and the like, the interval of integration in Fourier transform is set at an integral multiple of the half period of the current or the voltage having a frequency higher than the fundamental frequency. However, if the frequency of the current or the voltage, which frequency is higher than the fundamental frequency, is set to be random as in Patent Literature 1, the period of the current or the voltage also becomes random. Therefore, the interval of integration in Fourier transform cannot be set appropriately, and the position of rotation cannot be detected accurately.

The present invention has been made for solving the above problems. An object of the present invention is to provide a control apparatus and a control method that are capable of: calculating the amplitude of a current for position estimation without performing Fourier transform; as a result, reducing the amount of calculation, thereby reducing the load of calculation; and estimating the position of a rotor of the electric rotating machine accurately.

Means of Solution to the Problems

A control apparatus for an electric rotating machine, according to the present invention, performs drive control of the electric rotating machine. The control apparatus comprises a current detection means for detecting a electric rotating machine current flowing in the electric rotating machine, a position estimation means for estimating the position of a rotor of the electric rotating machine, based on the electric rotating machine current detected by the current detection means, a control means for outputting voltage instructions, based on the electric rotating machine current detected by the current detection means and information about the position of the rotor estimated by the position estimation means, and a voltage application means for applying a voltage for drive control, to the electric rotating machine, based on the voltage instructions outputted from the control means. The control means includes a drive voltage instruction calculation section for calculating drive voltage instructions for driving the electric rotating machine, a position estimation voltage generator for outputting position estimation voltage instructions for estimating the position of the rotor of the electric rotating machine, and adders for adding the position estimation voltage instructions to the drive voltage instructions, and outputting the resultant signals as the voltage instructions to the voltage application means. The position estimation means includes current extractors for extracting position estimation currents having the same frequency component as that of the position estimation voltage instructions included in the electric rotating machine currents detected by the current detection means, a position estimation current amplitude calculation section for calculating position estimation current amplitudes, based on the position estimation currents extracted by the current extractors, and a position calculation unit for performing estimation calculation of the position of the rotor of the electric rotating machine, based on the position estimation current amplitudes calculated by the position estimation current amplitude calculation section. The position estimation current amplitude calculation section calculates the position estimation current amplitude, based on the squares of the position estimation currents.

Effect of the Invention

A control apparatus for a electric rotating machine, according to the present invention, in the calculation of position estimation current amplitudes by a position estimation current amplitude calculation section of a position estimation means, calculates the position estimation current amplitudes by using only the squares of the position estimation currents, to estimate the position of a rotor, without performing Fourier transform. Therefore, the calculation and the memory for preparing a sine function and a cosine function which are needed in Fourier transform are not needed. As a result, it becomes possible to eliminate factors that increase the amount of calculation, the memory, and the like of a microcomputer or the like, and to perform drive control for the electric rotating machine with high efficiency and without causing unnecessary increase in cost.

BEST MODE FOR CARRYING OUT THE INVENTION

Embodiment 1

Figure 1:
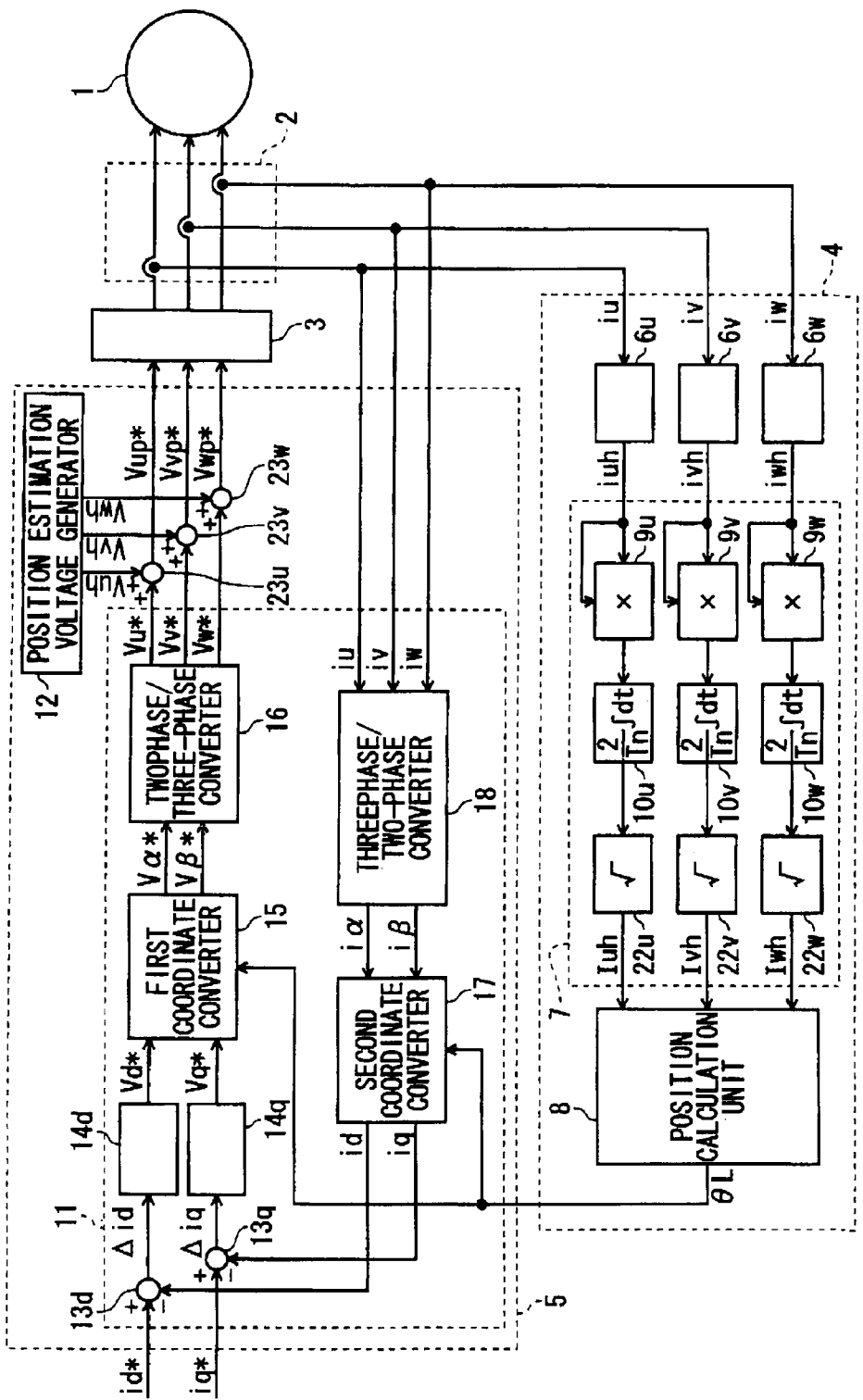
FIG. 1 is a diagram showing the configuration of a control apparatus for an electric rotating machine, according to embodiment 1 of the present invention.

FIG. 1 is a diagram showing the configuration of a control apparatus for an electric rotating machine, according to embodiment 1 of the present invention.

In embodiment 1, a synchronous machine of embedded-magnet type is applied to the electric rotating machine 1. The control apparatus of the present embodiment for controlling the electric rotating machine 1 includes: voltage application means 3, connected to the electric rotating machine 1, for applying a predetermined control voltage to the electric rotating machine 1; a current detection means 2 for detecting electric rotating machine currents iu, iv, and iw flowing between the voltage application means 3 and the electric rotating machine 1; position estimation means 4 for estimating a rotor position θL of the electric rotating machine 1, based on the electric rotating machine currents iu, iv, and iw detected by the current detection means 2; and a control means 5 for outputting voltage instructions Vup*, Vvp*, and Vwp* for drive control, to the voltage application means 3.

The current detection means 2 includes a current transformer and the like, for example. The current detection means 2 detects three phases of electric rotating machine currents including the U-phase electric rotating machine current iu, the V-phase electric rotating machine current iv, and the W-phase electric rotating machine current iw, from a power line connecting the electric rotating machine 1 and the voltage application means 3.

It is noted that, instead of detecting all of the U-phase, V-phase, and W-phase electric rotating machine currents iu, iv, and iw, the current detection means 2 may detect the electric rotating machine currents of any two phases and calculate the electric rotating machine current of the other phase by using the fact that the electric rotating machine currents are in three-phase equilibrium. Alternatively, the current detection means 2 may detect a DC bus current inputted to the voltage application means 3 and calculate the electric rotating machine currents from the DC bus current.

The voltage application means 3 includes a triangular wave comparison PWM inverter and the like, for example. The voltage application means 3 applies a voltage to the electric rotating machine 1, based on each of the voltage instructions Vup*, Vvp*, and Vwp* outputted from the control means 5.

The control means 5 includes a drive voltage instruction calculation section 11, a position estimation voltage generator 12, and adders 23*u*, 23*v*, and 23*w*. The adders 23*u*, 23*v*, and 23*w* add position estimation voltage instructions Vuh, Vvh, and Vwh outputted from the position estimation voltage generator 12, to drive voltage instructions Vu*, Vv*, and Vw* outputted from the drive voltage instruction calculation section 11, respectively, and the resultant signals are outputted as voltage instructions Vup*, Vvp*, and Vwp* to the voltage application means 3. Therefore, the voltage instructions Vup*, Vvp*, and Vwp*, which is applied to the voltage application means 3, are the drive voltage instructions Vu*, Vv*, and Vw* on which the position estimation voltage instructions Vuh, Vvh, and Vwh have been superimposed, respectively. It is noted that the position estimation voltage instructions Vuh, Vvh, and Vwh outputted from the position estimation voltage generator 12 will be described later in detail.

The drive voltage instruction calculation section 11 includes two subtractors 13*d* and 13*q*, a d-axis current controller 14*d*, a q-axis current controller 14*q*, a first coordinate converter 15, a two-phase/three-phase converter 16, a second coordinate converter 17, and a three-phase/two-phase converter 18.

The subtractor 13*d*, which is one of the subtractors, calculates a deviation Δid between a d-axis current instruction id* for driving the electric rotating machine 1, which is given from the outside of the control means 5, and a current id outputted from the second coordinate converter 17. The d-axis current controller 14*d* provided at the subsequent stage performs proportional-integral control (PI control) such that the deviation Δid becomes zero, thereby calculating a d-axis voltage instruction Vd*.

The subtractor 13*q*, which is the other one of the subtractors, calculates a deviation Δiq between a q-axis current instruction iq* for driving the electric rotating machine 1, which is given from the outside of the control means 5, and a current iq outputted from the second coordinate converter 17. The q-axis current controller 14*q* provided at the subsequent stage performs proportional-integral control (PI control) such that the deviation Δiq becomes zero, thereby calculating a q-axis voltage instruction Vq*.

The first coordinate converter 15 converts the d-axis voltage instruction Vd* and the q-axis voltage instruction Vq* outputted from the d-axis current controller 14*d* and the q-axis current controller 14*q*, into voltage instructions Vα* and Vβ* on two axes (α-β axes) at rest, respectively. The two-phase/three-phase converter 16 converts the voltage instructions Vα* and Vβ* outputted from the first coordinate converter 15, into drive voltage instructions Vu*, Vv*, and Vw* in a three-phase AC coordinate system.

The three-phase/two-phase converter 18 converts the electric rotating machine currents iu, iv, and iw detected by the current detection means 2, into currents iα and iβ on two axes (α-β axes) at rest. The second coordinate converter 17 converts the currents iα and iβ outputted from the three-phase/two-phase converter 18, into currents id and iq on two rotational axes (d-q axes) rotating in synchronization with an estimated position θL outputted from the position estimation means 4 described later, and outputs the currents id and iq to the subtractors 13*d* and 13*q*, respectively.

The position estimation voltage generator 12 generates, for estimating the position of the rotor of the electric rotating machine 1, the position estimation voltage instructions Vuh, Vvh, and Vwh having frequencies different from those of the drive voltage instructions Vu*, Vv*, and Vw* outputted from the drive voltage instruction calculation section 11. The position estimation voltage instructions Vuh, Vvh, and Vwh may be of any type as long as their frequencies are different from those of the drive voltage instructions Vu*, Vv*, and Vw*. In embodiment 1, the position estimation voltage instructions Vuh, Vvh, and Vwh are three-phase AC position estimation voltage instructions.

Figure 2:
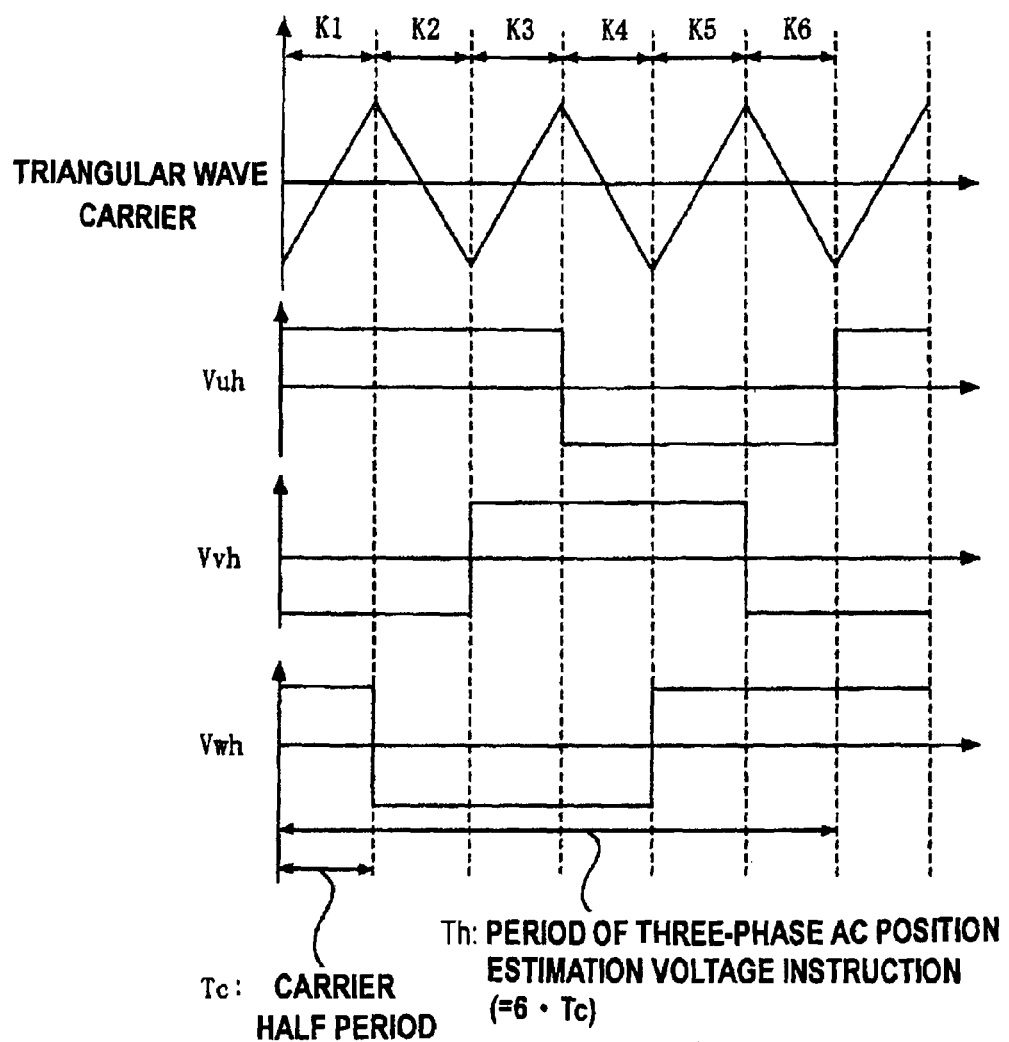
FIG. 2 is a diagram showing the waveforms of position estimation voltages generated by a position estimation voltage generator of the control apparatus.

That is, for example, as shown in FIG. 2, in the case where the voltage application means 3 is a triangular wave comparison PWM inverter, if a half period Tc of a triangular wave carrier used for the triangular wave comparison PWM inverter to perform PWM modulation is one interval, the three-phase AC position estimation voltage instructions Vuh, Vvh, and Vwh are signals whose one period has a length of six intervals (=6·Tc). In addition, the position estimation voltage instructions Vuh, Vvh, and Vwh are set such that each of them is displaced by two intervals (=2·Tc) from each other, so that they are in three-phase equilibrium.

The position estimation means 4 includes three current extractors 6*u*, 6*v*, and 6*w*, a position estimation current amplitude calculation section 7, and a position calculation unit 8.

As previously described, the voltage instructions Vup*, Vvp*, and Vwp*, which are applied to the voltage application means 3, are the drive voltage instructions Vu*, Vv*, and Vw*, outputted from the control means 5, on which the position estimation voltage instructions Vuh, Vvh, and Vwh outputted from the position estimation voltage generator 12 have been superimposed, respectively. Therefore, the electric rotating machine currents iu, iv, and iw detected by the current detection means 2 include position estimation currents iuh, ivh, and iwh having the same frequency components as those of the position estimation voltage instructions Vuh, Vvh, and Vwh, respectively.

Therefore, the current extractors 6*u*, 6*v*, and 6*w* extract the position estimation currents iuh, ivh, and iwh having the same frequency components as those of the position estimation voltage instructions Vuh, Vvh, and Vwh, from the electric rotating machine currents iu, iv, and iw detected by the current detection means 2, respectively. Specifically, the position estimation currents iuh, ivh, and iwh are extracted by using a bandpass filter, or frequency components, of the electric rotating machine currents iu, iv, and iw, that are the same as those of the position estimation voltage instructions Vuh, Vvh, and Vwh, respectively are attenuated by inputting the electric rotating machine currents iu, iv, and iw to a notch filter, and the resultant currents that have passed the notch filter are subtracted from the electric rotating machine currents iu, iv, and iw, respectively, whereby the position estimation currents iuh, ivh, and iwh are extracted.

The position estimation current amplitude calculation section 7 calculates position estimation current amplitudes Iuh, Ivh, and Iwh by using only the squares of the position estimation currents iuh, ivh, and iwh which are outputted from the current extractors 6u, 6v, and 6w, without performing Fourier transform. Therefore, in embodiment 1, the position estimation current amplitude calculation section 7 includes multipliers 9u, 9v, and 9w, integrators 10u, 10v, and 10w, and square root calculators 22u, 22v, and 22w, which correspond to the respective phases.

Hereinafter, a method of calculating the position estimation current amplitudes Iuh, Ivh, and Iwh based on the position estimation currents iuh, ivh, and iwh without performing Fourier transform, will be described in detail.

Figure 3:
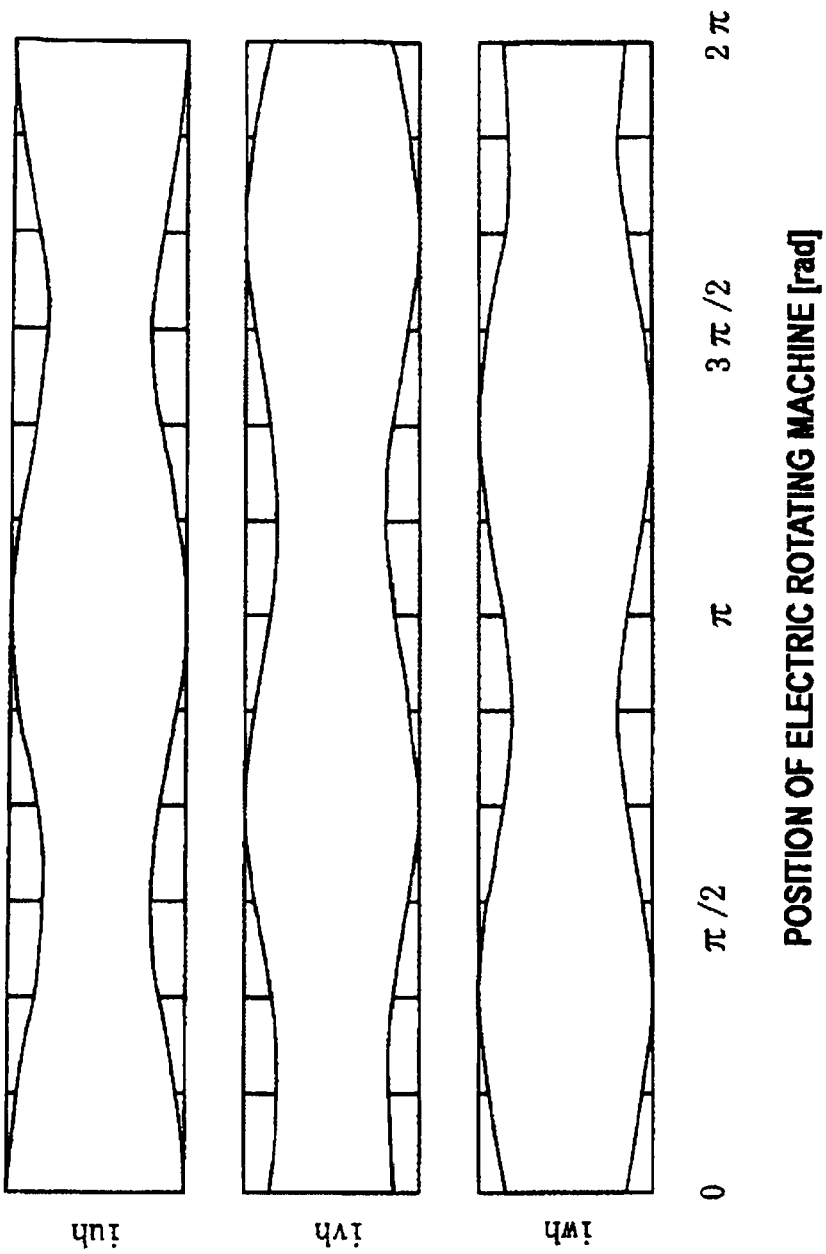
FIG. 3 is a diagram showing the waveforms of position estimation currents extracted by a current extractor of the control apparatus.

When the three-phase AC position estimation voltage instructions Vuh, Vvh, and Vwh as shown in FIG. 2 are applied to the electric rotating machine 1, the amplitudes of the position estimation currents iuh, ivh, and iwh extracted by the respective current extractors 6u, 6v, and 6w vary in a cosine function fashion in accordance with the position of the electric rotating machine 1 as shown in FIG. 3, because of saliency of the electric rotating machine 1. This is represented by expression (1) shown below. Expression (1) includes position (angle) information θ of the electric rotating machine 1. Therefore, if the position estimation current amplitudes Iuh, Ivh, and Iwh are calculated, a position θL of the electric rotating machine 1 can be estimated.

[Expression 1]

$$iuh = \left\{Ih + \frac{Iha}{2} \cdot \cos(\theta)\right\} \cdot \sin(\omega_h t) \quad (1)$$
$$ivh = \left\{Ih + \frac{Iha}{2} \cdot \cos\left(\theta + \frac{2}{3}\pi\right)\right\} \cdot \sin\left(\omega_h t + \frac{2}{3}\pi\right)$$
$$iwh = \left\{Ih + \frac{Iha}{2} \cdot \cos\left(\theta - \frac{2}{3}\pi\right)\right\} \cdot \sin\left(\omega_h t - \frac{2}{3}\pi\right)$$

$\begin{pmatrix} Ih: \text{The average of position estimation current amplitudes} \\ Iha: \text{The amount of variation of the position estimation} \\ \text{current according to the position of the electric rotating} \\ \text{machine} \\ \theta: \text{The position (angle) of the electric rotating machine} \\ \omega_h: \text{The angular frequency of the position estimation} \\ \text{voltage instruction} \end{pmatrix}$ Here, for the purpose of comparison with the feature of the present invention, first, the principle for calculating, from the position estimation currents iuh, ivh, and iwh shown in FIG. 3 and expression (1), the amplitude components thereof by using Fourier transform which is a known technique, will be described.

In the case where an amplitude Sn_amp of a signal Sn(t) is to be calculated by using Fourier transform, the signal Sn(t) is multiplied by a function (hereinafter, referred to as a correlation function) having the same frequency as that of the signal Sn(t), whereby the correlation between the signal Sn(t) and the correlation function is calculated, and then the amplitude Sn_amp is calculated. Normally, a sine function and a cosine function are used as correlation functions by which the signal Sn(t) is to be multiplied.

As a specific example, the case where the amplitude Sn_amp is calculated from the signal Sn(t) represented by expression (2), will be assumed here. It is noted that expression (2) can be represented by expression (3) through combination of trigonometric functions. Therefore, the amplitude Sn_amp of the signal Sn(t) results in $(A^2+B^2)^{1/2}$.

For calculating the amplitude Sn_amp by using Fourier transform, the signal Sn(t) is multiplied by each of a sine function sin ωnt and a cosine function cos ωnt, having the same frequencies as that of the signal Sn(t), which are prepared in advance, the resultant signal is integrated over one period (time corresponding to the one period will be denoted by Tn), and then the resultant signal is multiplied by 2/Tn, whereby the correlation between the signal Sn(t) and the sine function sin ωnt, and the correlation between the signal Sn(t) and the cosine function cos ωnt, that is, a magnitude As of the sine function component of the signal Sn(t), and a magnitude Ac of the cosine function component of the signal Sn(t) are calculated as shown by expression (4) and expression (5), respectively. Then, the square root of the sum of the square of the magnitude As of the sine function component, and the square of the magnitude Ac of the cosine function component is calculated as shown by expression (6). That is, the same result as in expression (3) is obtained. Thus, it is found that the amplitude Sn_amp is calculated by using Fourier transform.

[Expression 2]

$$Sn(t) = A \cdot \sin(\omega_n t) + B \cdot \cos(\omega_n t) \quad (2)$$

[Expression 3]

$$Sn(t) = \sqrt{A^2 + B^2} \cdot \sin(\omega_n t + \delta) \quad (3)$$

where $\delta = \tan^{-1}\frac{B}{A}$

[Expression 4]

$$As = \frac{2}{Tn}\int_0^{Tn} Sn(t) \cdot \sin\omega_n t \, dt \quad (4)$$
$$= \frac{2}{Tn}\int_0^{Tn} \{A \cdot (\sin\omega_n t)^2 + B \cdot \cos\omega_n t \cdot \sin\omega_n t\}dt$$
$$= B$$

[Expression 5]

$$Ac = \frac{2}{Tn}\int_0^{Tn} Sn(t) \cdot \cos\omega_n t \, dt \quad (5)$$
$$= \frac{2}{Tn}\int_0^{Tn} \{A \cdot \cos\omega_n t \cdot \sin\omega_n t + B \cdot (\cos\omega_n t)^2\}dt$$
$$= A$$

[Expression 6]

$$Sn\_amp = \sqrt{As^2 + Ac^2} \quad (6)$$
$$= \sqrt{A^2 + B^2}$$

In expression (2), for the purpose of facilitating the understanding, the signal Sn(t) has only an angular frequency ωn as its frequency component, and does not have other frequency components. However, Fourier transform is significantly effective in the case where the amplitude of a signal having a specific frequency is to be calculated from the signal Sn(t)

having a plurality of frequency components. However, in the method using Fourier transform, as shown by expression (4) and expression (5), the sine function sin ωnt and the cosine function cos ωnt having the same frequencies as that of the signal Sn(t) whose amplitude is to be calculated, need to be prepared in advance. Therefore, there are disadvantages that the amount of calculation by a microcomputer or the like for preparing the sine function sin ωnt and the cosine function cos ωnt increases, and that, when the sine function sin ωnt and the cosine function cos ωnt are stored in the microcomputer or the like, the memory increases for storing these functions.

Therefore, in embodiment 1, instead of performing Fourier transform as described above, the position estimation current amplitude calculation section 7 calculates the position estimation current amplitudes Iuh, Ivh, and Iwh by using only the squares of the position estimation currents iuh, ivh, and iwh outputted from the current extractors 6u, 6v, and 6w. Hereinafter, the details of this method will be described.

In calculation of the amplitudes Iuh, Ivh, and Iwh based on the position estimation currents iuh, ivh, and iwh by the position estimation current amplitude calculation section 7, it is necessary to, as in the case of performing Fourier transform, calculate correlations by multiplying the position estimation currents iuh, ivh, and iwh by respective correlation functions having the same frequency components as those of the position estimation currents iuh, ivh, and iwh, whose amplitudes are to be calculated.

In this case, the position estimation currents iuh, ivh, and iwh inputted from the current extractor 6 to the position estimation current amplitude calculation section 7 are signals obtained by extracting, from the electric rotating machine currents iu, iv, and iw, the same frequency components as those of the position estimation voltage instructions Vuh, Vvh, and Vwh, respectively. Therefore, the position estimation currents iuh, ivh, and iwh mainly include signals having the same frequency components as those of the position estimation voltage instructions Vuh, Vvh, and Vwh, respectively.

Therefore, the position estimation current amplitude calculation section 7 calculates the correlations between the position estimation currents iuh, ivh, and iwh, and themselves, that is, the autocorrelations, as correlation functions by which the position estimation currents iuh, ivh, and iwh are to be multiplied, respectively, instead of using a sine function and a cosine function prepared in advance. In the calculation, the autocorrelations are the squares of the position estimation currents iuh, ivh, and iwh. By using the autocorrelations, a sine function and a cosine function do not need to be prepared in advance, and the amount of calculation and the memory can be largely reduced in comparison with the case of performing Fourier transform.

After the multipliers 9u, 9v, and 9w for the respective phases square the position estimation currents iuh, ivh, and iwh to calculate the autocorrelations thereof in the above-described manner, respectively, the integrators 10u, 10v, and 10w integrate the autocorrelations over one period (time corresponding to the one period will be denoted by Tn), and multiply the resultant values by (2/Tn), and then the square root calculators 22u, 22v, and 22w calculate the square roots of the outputs from the integrators 10u, 10v, and 10w, whereby the position estimation current amplitudes Iuh, Ivh, and Iwh can be calculated, respectively, as in the case of performing Fourier transform.

For example, if the position estimation current iuh which corresponds to the u-phase is represented by the right side of expression (2), the position estimation current amplitude Iuh is calculated by using the autocorrelation, as shown by expression (7).

[Expression 7]

$$\begin{aligned} Iuh &= \sqrt{\frac{2}{Tn}\int_0^{Tn}\{A\cdot\sin\omega_n t + B\cdot\cos\omega_n t\}^2\,dt} \\ &= \sqrt{\frac{2}{Tn}\int_0^{Tn}\left\{\begin{array}{c}A^2\cdot(\sin\omega_n t)^2 + A\cdot B\cdot\sin\omega_n t\cdot \\ \cos\omega_n t + B^2\cdot(\cos\omega_n t)^2\end{array}\right\}dt} \\ &= \sqrt{\frac{2}{Tn}\int_0^{Tn}\left\{\begin{array}{c}\frac{1}{2}(A^2\cdot B^2) + \frac{1}{2}(A^2 - B^2)\cos 2\omega_n t + \\ 2\cdot A\cdot B\cdot\sin 2\omega_n t\end{array}\right\}dt} \\ &= \sqrt{A^2 + B^2}\end{aligned} \quad (7)$$

It is noted that in expression (7), the interval of integration is the one period Tn of the position estimation current iuh. However, the interval of integration does not necessarily need to be the one period Tn. The interval of integration may be a given period Tr that is equal to or larger than at least a half period. Particularly, it is desirable that the interval of integration is an m multiple (m is a positive integer) of the half period of each of the position estimation currents iuh, ivh, and iwh, that is, the interval of integration is m·(Tn/2) (m=1, 2, 3, ... ). In this case, the resultant value of the integration is multiplied by 2/(m·Tr), instead of (2/Tr). It is noted that although expression (7) shows the case where the position estimation current amplitude Iuh which corresponds to the u-phase is calculated, the position estimation current amplitudes Ivh and Iwh which corresponds to the v-phase and the w-phase, respectively, are also calculated in the same manner.

Next, the position calculation unit 8 calculates an estimated rotor position (hereinafter, referred to as an estimated position) θL of the electric rotating machine 1, based on the position estimation current amplitudes Iuh, Ivh, and Iwh calculated by the position estimation current amplitude calculation section 7. A method of the calculation will be described below. It is noted that a method of the calculation of the estimated position θL of the electric rotating machine 1 is not limited to the method described below, and any method may be used as long as the estimated position θL is calculated based on the position estimation current amplitudes Iuh, Ivh, and Iwh.

Figure 4:
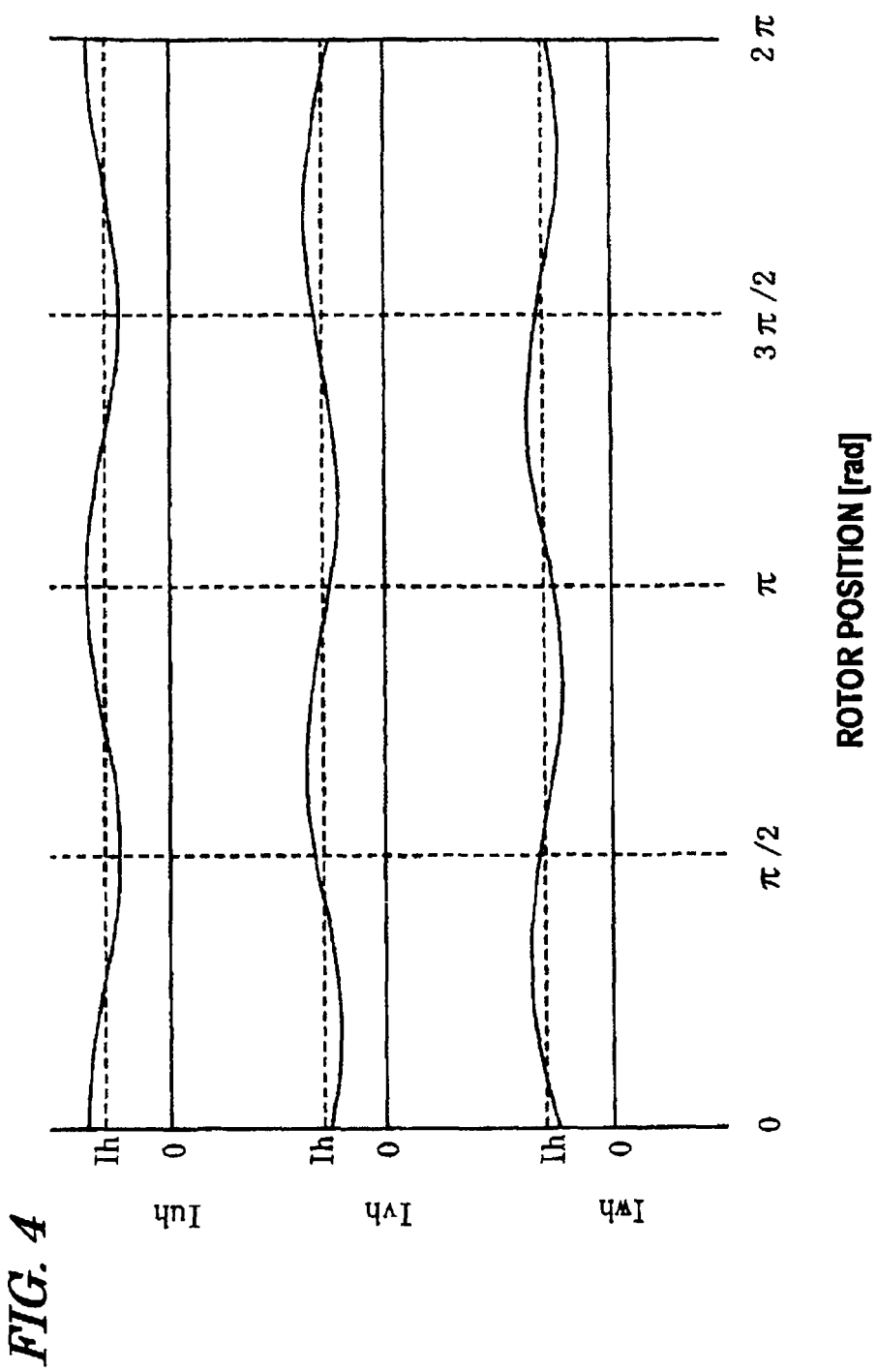
FIG. 4 is a diagram showing the waveforms of position estimation current amplitudes obtained by a position estimation current amplitude calculation section of the control apparatus.

The position estimation current amplitudes Iuh, Ivh, and Iwh obtained by the position estimation current amplitude calculation section 7 in the above-described manner are values obtained based on the position estimation currents iuh, ivh, and iwh represented by expression (1) or shown in FIG. 3. Therefore, as shown in FIG. 4, an offset Ih has been superimposed on each of the position estimation current amplitudes Iuh, Ivh, and Iwh, and the position estimation current amplitudes Iuh, Ivh, and Iwh vary with ½ of the period of the rotor position (electric angle) of the electric rotating machine 1.

Therefore, as shown by expression (8), first, the position calculation unit 8 subtracts the offset Ih from each of the position estimation current amplitudes Iuh, Ivh, and Iwh, thereby calculating position calculation signals dIu, dIv, and dIw. Here, since the position estimation current amplitudes Iuh, Ivh, and Iwh are in three-phase equilibrium, the offset Ih can be calculated as shown by expression (9).

[Expression 8]

$$dIu = Iuh - Ih$$
$$= \frac{Iha}{2}\cos(2\theta)$$
$$dIv = Ivh - Ih$$
$$= \frac{Iha}{2}\cos\left(2\theta + \frac{2}{3}\pi\right)$$
$$dIw = Iwh - Ih$$
$$= \frac{Iha}{2}\cos\left(2\theta - \frac{2}{3}\pi\right)$$

(8)

[Expression 9]

$$Ih = \frac{Iuh + Ivh + Iwh}{3}$$

(9)

The estimated position θL of the electric rotating machine 1 can be calculated by performing inverse cosine operation for one of the position calculation signals dIu, dIv, and dIw shown in expression (8). However, it is necessary to perform inverse cosine operation and to store an inverse cosine function in advance, resulting in increase of the amount of calculation and the memory. Therefore, this method is not preferable. Instead of using an inverse cosine function, embodiment 1 employs a method of calculating the estimated position θL of the electric rotating machine 1 by using linear approximation. Hereinafter, this method will be described.

Figure 5:
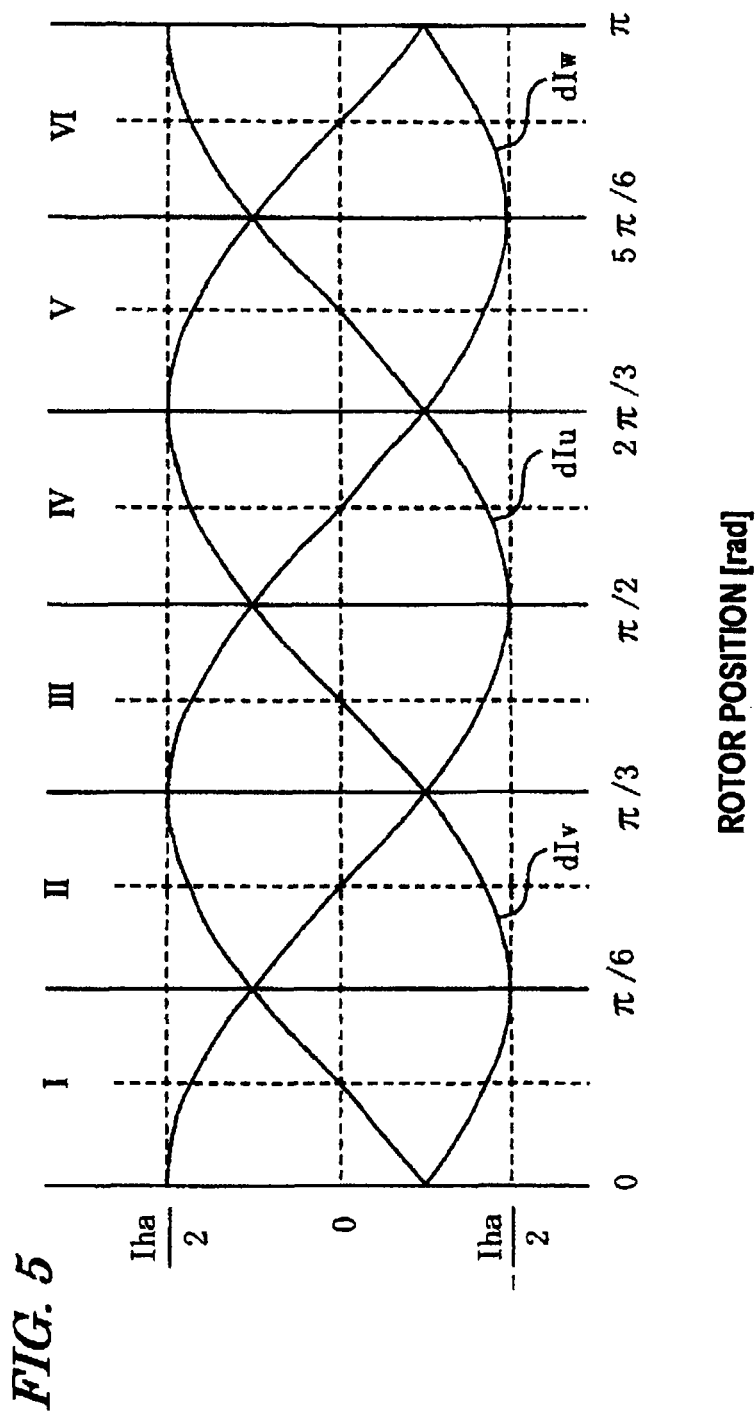
FIG. 5 is a diagram for illustrating the operation of a position calculation unit of the control apparatus.

In the position calculation unit 8, based on the interrelationship among the position calculation signals dIu, dIv, and dIw calculated by expression (8), the position calculation signals dIu, dIv, and dIw are divided into six intervals (I-VI) whose middle positions θM are represented by expression (10), as shown in FIG. 5.

[Expression 10]

$$\theta M = N\frac{\pi}{6} + \frac{\pi}{12}(N = 0, 1, 2 \ldots 5)$$

(10)

In each of the intervals (I-VI), one of the position calculation signals dIu, dIv, and dIw that zero-crosses at the middle of the interval is represented by a function of sin or −sin. Since the function of sin or −sin in each of the intervals (I-VI) is considered as a straight line, the signal in each of the intervals (I-VI) is subjected to linear approximation, and a deviation ΔθML between the middle position θM of each of the intervals (I-VI), and the estimated position θL of electric rotating machine 1 (≈ the position θ of the electric rotating machine 1) is calculated based on expression (11). Here, dI_uvw in expression (11) is a value on the vertical axis of each of the position calculation signals dIu, dIv, and dIw as it is when the signal zero-crosses at the middle position θM in each of the intervals (I-VI). In addition, since Iha is the amount of variation of each of the position estimation currents iuh, ivh, and iwh according to the position of the electric rotating machine as shown in expression (1), Iha/2 is the amplitude of each of the position calculation signals dIu, dIv, and dIw.

[Expression 11]

$$\Delta\theta ML = \frac{dI\_uvw}{(Iha/2)}$$

(11)

It is noted that Iha/2 in expression (11) may be calculated from the square root of the sum of the squares of the position calculation signals dIu, dIv, and dIw, as shown by expression (12).

[Expression 12]

$$\frac{Iha}{2} = \sqrt{\frac{2(dIu^2 + dIv^2 + dIw^2)}{3}}$$

(12)

Then, as shown by expression (13), ΔθML calculated by expression (11) and the middle position θM are summed, whereby the estimated position θL of the electric rotating machine 1 is calculated.

[Expression 13]

$$\theta L = \theta M + \Delta\theta ML$$

(13)

By configuring the position calculation unit 8 as described above, it becomes possible to easily calculate the rotor position θL without performing inverse cosine operation, or storing an inverse cosine function in advance.

In the above description, the position estimation current amplitude calculation section 7 calculates the position estimation current amplitudes Iuh, Ivh, and Iwh (absolute values) by using autocorrelations. However, in the case where the position calculation unit 8 estimates the position by using the interrelationship among the position calculation signals dIu, dIv, and dIw, it is only necessary to obtain the interrelationship among the position calculation signals dIu, dIv, and dIw. Therefore, the position estimation current amplitude calculation section 7 does not necessarily need to calculate the position estimation current amplitudes Iuh, Ivh, and Iwh (absolute values), but may calculate position estimation current amplitude ratios Iuh_a, Ivh_a, and Iwh_a that are the amplitude ratios of the position estimation current amplitudes of the respective phases by using autocorrelations.

In this way, when the position estimation current amplitude calculation section 7 calculates the position estimation current amplitude ratios Iuh_a, Ivh_a, and Iwh_a, multiplication by $(2/Tn)^{1/2}$ which is needed for calculating the absolute values is not needed, and the square root is not needed, either. Therefore, for example, expression (7) can be simplified as expression (14).

[Expression 14]

$$Iuh\_a = \int_0^{Tn} \{A \cdot \sin\omega_n t + B \cdot \cos\omega_n t\}^2 \, dt$$

(14)

Thus, it becomes possible to simplify the configuration of the position estimation current amplitude calculation section 7 and reduce the load of calculation. It is noted that, also in the case where the position estimation current amplitude calculation section 7 calculates the position estimation current amplitude ratios Iuh_a, Ivh_a, and Iwh_a of the respective phases, the position calculation unit 8 can calculate the estimated position θL in the same manner, based on expressions (8) to (13).

As described above, in embodiment 1, the configuration of the position estimation current amplitude calculation section 7 is such that the autocorrelations obtained by squaring the position estimation currents iuh, ivh, and iwh are used for calculating the position estimation current amplitudes Iuh, Ivh, and Iwh. Therefore, it is not necessary to prepare a sine function and a cosine function in advance as in the case of performing Fourier transform. Therefore, the amount of calculation and the memory can be largely reduced.

In addition, in the case of performing Fourier transform, which of the cosine function component and the sine function component is included in the signal whose amplitude has been calculated, and what amount of that component is included in the signal are not known. Therefore, two functions of a cosine function and a sine function need to be used as correlation functions. On the other hand, in embodiment 1, since the position estimation current amplitude calculation section 7 uses autocorrelations, only a signal whose amplitude is to be calculated is needed as a correlation function by which the signal is to be multiplied. Therefore, the number of multiplications can be decreased by 1 in comparison with the case of performing Fourier transform. Also in this respect, the amount of calculation can be reduced in comparison with the case of performing Fourier transform.

In addition, in the case where the position is estimated by using the interrelationship among the position calculation signals dIu, dIv, and dIw, the position estimation current amplitudes Iuh, Ivh, and Iwh (absolute values) do not need to be calculated. Therefore, calculation of the absolute values by using the autocorrelations is not needed, and the amount of calculation is further reduced, which is advantageous.

Embodiment 2

Figure 6:
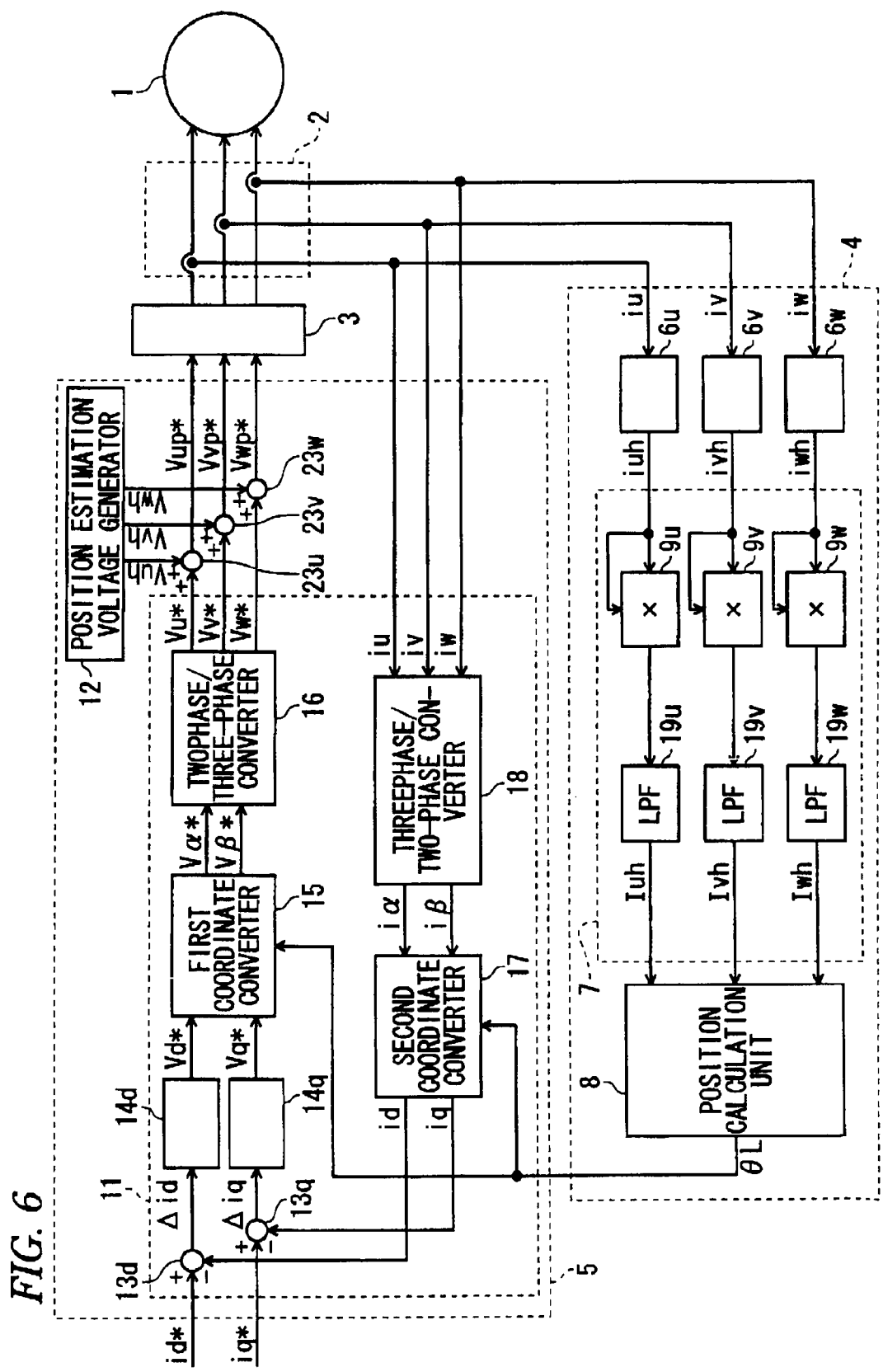
FIG. 6 is a diagram showing the configuration of the control apparatus for the electric rotating machine, according to embodiment 2 of the present invention.

FIG. 6 is a diagram showing the configuration of a control apparatus for an electric rotating machine, according to embodiment 2 of the present invention. Components that correspond to or are the same as those in embodiment 1 shown in FIG. 1 are denoted by the same reference numerals. It is noted that, in FIG. 6, the configurations other than that of the position estimation current amplitude calculation section 7 of the position estimation means 4 are the same as in embodiment 1. Therefore, the description of the configurations other than that of the position estimation current amplitude calculation section 7 will be omitted here.

In the position estimation means 4, the current extractors 6*u*, 6*v*, and 6*w* extract the position estimation currents iuh, ivh, and iwh having the same frequency components as those of the position estimation voltage instructions Vuh, Vvh, and Vwh from the electric rotating machine currents iu, iv, and iw, respectively, as in embodiment 1. Therefore, the position estimation current amplitude calculation section 7 calculates the position estimation current amplitudes Iuh, Ivh, and Iwh by using the autocorrelation, and outputs the position estimation current amplitudes Iuh, Ivh, and Iwh which are the result of the calculation, to the position calculation unit 8 at the subsequent stage.

In this case, the position estimation current amplitude calculation section 7 calculates the position estimation current amplitudes Iuh, Ivh, and Iwh, based on the squares of the position estimation currents iuh, ivh, and iwh by using the autocorrelation, as in embodiment 1. The way of the calculation is different from that in embodiment 1.

That is, in the position estimation current amplitude calculation section 7 of embodiment 1, the multipliers 9*u*, 9*v*, and 9*w* square the position estimation currents iuh, ivh, and iwh, the integrators 10*u*, 10*v*, and 10*w* integrate the resultant values, and then the square root calculators 22*u*, 22*v*, and 22*w* calculate the square roots of the resultant values, whereby the position estimation current amplitudes Iuh, Ivh, and Iwh are calculated, respectively, whereas in the position estimation current amplitude calculation section 7 of embodiment 2, the multipliers 9*u*, 9*v*, and 9*w* square the position estimation currents iuh, ivh, and iwh, and the resultant values are inputted to low-pass filters 19*u*, 19*v*, and 19*w*, whereby the position estimation current amplitudes Iuh, Ivh, and Iwh are calculated, respectively. Hereinafter, the principle for the calculation will be described.

Figure 7:
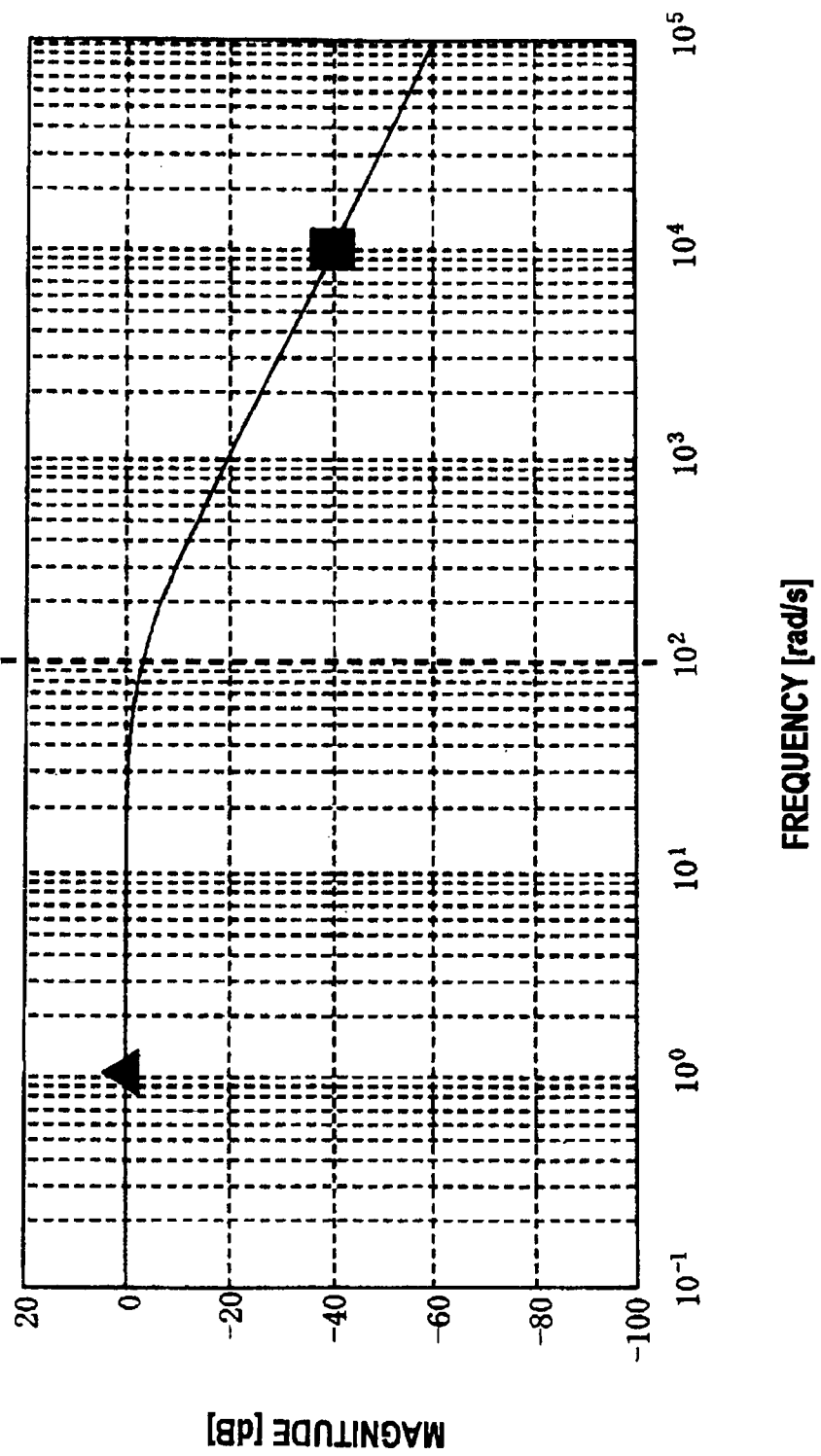
FIG. 7 is a diagram showing a frequency attenuation characteristic for illustrating the filter operation of a low-pass filter of a position estimation current amplitude calculation section of the control apparatus.

FIG. 7 is an example of a frequency characteristic of a low-pass filter having a time constant of 0.01 [s] (cutoff frequency is 100 [rad/s]). The frequencies of the position estimation currents iuh, ivh, and iwh are the same as those of the position estimation voltage instructions Vuh, Vvh, and Vwh generated by the position estimation voltage generator 12, and are sufficiently higher than those of the drive voltage instructions Vu*, Vv*, and Vw* outputted from the drive voltage instruction calculation section 11, respectively. On the other hand, the frequencies (temporal variations) of the position estimation current amplitudes Iuh, Ivh, and Iwh are two times as high as the frequency of the rotation of the electric rotating machine 1, that is, two times as high as the frequencies of the drive voltage instructions Vu*, Vv*, and Vw*, as shown in FIG. 4, and are sufficiently lower than the frequencies of the position estimation currents iuh, ivh, and iwh, respectively.

Thus, the frequencies of the position estimation currents iuh, ivh, and iwh are largely different from those of the position estimation current amplitudes Iuh, Ivh, and Iwh, respectively. Therefore, if the time constant is appropriately set in advance such that the cutoff frequencies of the low-pass filters 19*u*, 19*v*, and 19*w* are equal to or lower than those of the position estimation currents iuh, ivh, and iwh (which are the same as those of the position estimation voltages), and are equal to or higher than those of the position estimation current amplitudes Iuh, Ivh, and Iwh, respectively, only signals of the position estimation current amplitudes Iuh, Ivh, and Iwh pass the low-pass filters 19*u*, 19*v*, and 19*w*, respectively, and the position estimation currents iuh, ivh, and iwh are cut off. As a result, the position estimation current amplitudes Iuh, Ivh, and Iwh can be detected.

For example, in FIG. 7, if the angular frequencies of the position estimation currents iuh, ivh, and iwh are 10000 [rad/s] (mark ■ in FIG. 7), and the frequencies of the position estimation current amplitudes Iuh, Ivh, and Iwh are 1 [rad/s] (mark ▲ in FIG. 7), the gains with respect to the position estimation currents iuh, ivh, and iwh are −40 [dB], and the gains with respect to the variations of the position estimation current amplitudes Iuh, Ivh, and Iwh are 0 [dB]. Therefore, it is found that the low-pass filters 19*u*, 19*v*, 19*w* can detect the position estimation current amplitudes Iuh, Ivh, and Iwh, respectively.

As described above, in embodiment 2, the position estimation current amplitude calculation section 7 includes the low-pass filters 19*u*, 19*v*, and 19*w* in place of the integrators 10*u*, 10*v*, and 10*w* and the square root calculators 22*u*, 22*v*, and 22*w* of the embodiment 1, and the squares of the position estimation currents iuh, ivh, and iwh are inputted to the low-pass filters 19*u* to 19*w*, respectively, whereby the position estimation current amplitudes Iuh, Ivh, and Iwh are calculated. Therefore, an operation of integration and the like are not needed, and increase in the amount of calculation and the memory of the microcomputer or the like can be suppressed in comparison with embodiment 1.

In the case where, as in the conventional technique disclosed in Patent Literature 1 previously described, the frequencies of the position estimation voltages Vuh, Vvh, and Vwh are set to be random in order to reduce noise caused by the position estimation voltages applied to the electric rotating machine, which position estimation voltages have frequencies higher than the frequency of a drive signal for driving the rotary electric machine, which is equal to a fundamental frequency, when the position estimation current amplitudes Iuh, Ivh, and Iwh are to be calculated by integrating the squares of the position estimation currents iuh, ivh, and iwh as in embodiment 1, it is difficult to correctly calculate the position estimation current amplitudes Iuh, Ivh, and Iwh unless the interval of the integration is appropriately set, because the periods of the position estimation currents iuh, ivh, and iwh are also random.

On the other hand, in the case of using the low-pass filters 19u, 19v, and 19w as in embodiment 2, the position estimation current amplitudes Iuh, Ivh, and Iwh can be calculated without taking the interval of the integration into consideration as described above. Therefore, there is an advantage in the case where the frequencies of the position estimation voltages are set to be random. In this case, it is preferable that the cutoff frequencies of the low-pass filters 19u, 19v, and 19w are equal to or lower than the lower limits (lower limits of frequencies which can vary in a random manner) of the frequencies of the position estimation currents iuh, ivh, and iwh, and are equal to or higher than the frequencies of the position estimation current amplitudes Iuh, Ivh, and Iwh, respectively.

In embodiment 2, the case where the position estimation current amplitude calculation section 7 calculates the position estimation current amplitudes Iuh, Ivh, and Iwh (absolute values) has been assumed in the description. However, the present invention is not limited thereto. As in embodiment 1, the position estimation current amplitude ratios Iuh_a, Ivh_a, and Iwh_a which are the amplitude ratios of the position estimation current amplitudes of the respective phases may be calculated by using the autocorrelations, whereby the same effect is obtained.

Embodiment 3

Figure 8:
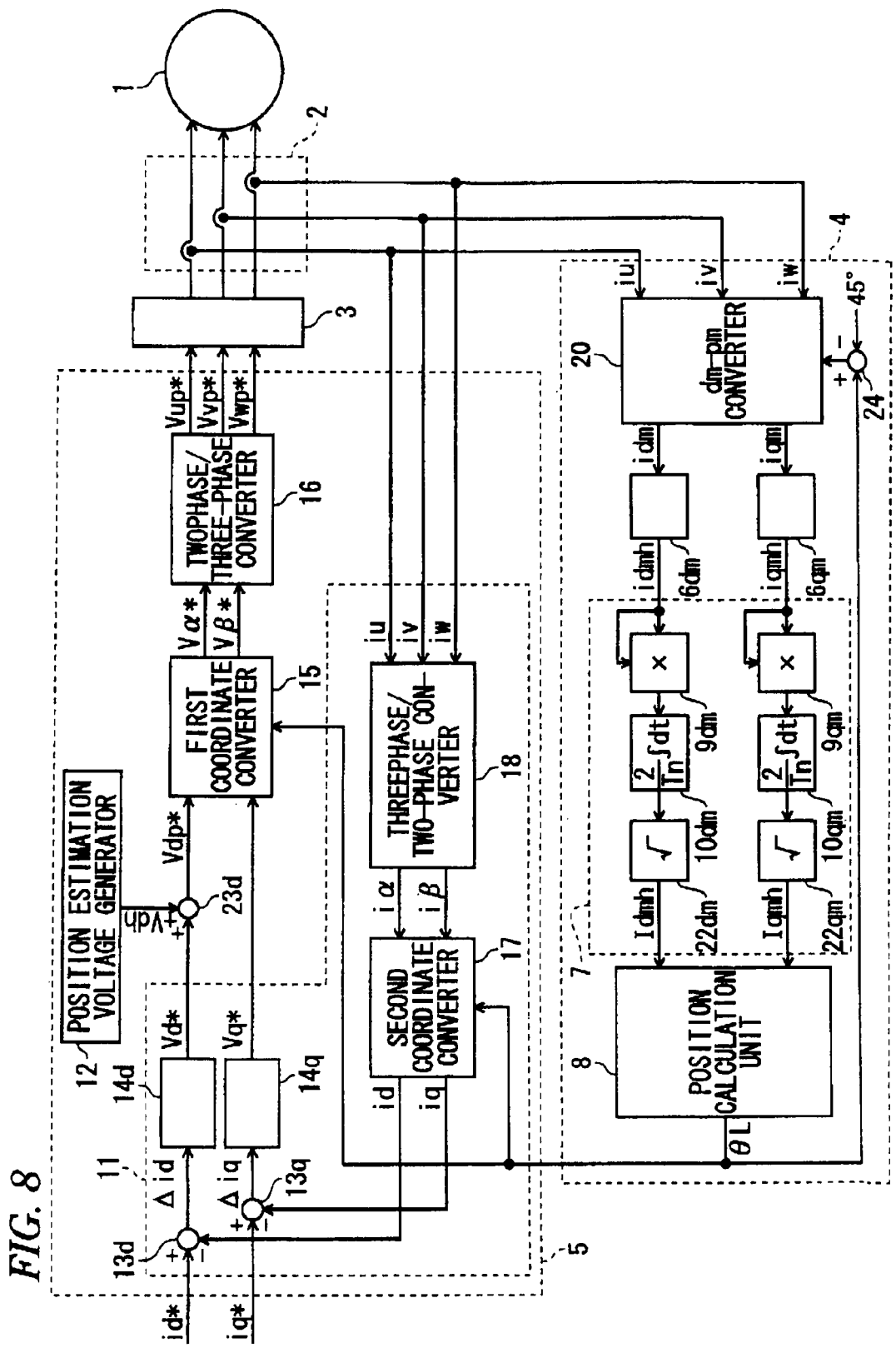
FIG. 8 is a diagram showing the configuration of the control apparatus for the electric rotating machine, according to embodiment 3 of the present invention.

FIG. 8 is a diagram showing the configuration of a control apparatus for the electric rotating machine, according to embodiment 3 of the present invention. Components that correspond to or are the same as those in embodiment 1 shown in FIG. 1 are denoted by the same reference numerals. It is noted that, in FIG. 8, the configurations other than those of the position estimation means 4 and the control means 5 are the same as in embodiment 1. Therefore, the description of the configurations other than those of the position estimation means 4 and the control means 5 will be omitted here.

The control means 5 includes the drive voltage instruction calculation section 11, the position estimation voltage generator 12, the first coordinate converter 15, the two-phase/three-phase converter 16, and an adder 23d. The drive voltage instruction calculation section 11 includes the two subtractors 13d and 13q, the d-axis current controller 14d, the q-axis current controller 14q, the second coordinate converter 17, and the three-phase/two-phase converter 18. In this case, the configurations of the subtractors 13d and 13q, the d-axis current controller 14d, the q-axis current controller 14q, the second coordinate converter 17, and the three-phase/two-phase converter 18 are the same as in embodiment 1. Therefore, the description thereof will be omitted here.

The feature of the control means 5 of embodiment 3 is that, in order to estimate the position of the rotor of the electric rotating machine 1, the position estimation voltage generator 12 outputs a position estimation voltage instruction Vdh having a frequency different from that of the drive voltage instruction Vd* outputted from the drive voltage instruction calculation section 11. In this case, the position estimation voltage instruction Vdh may be of any type as long as the frequency thereof is different from that of the drive voltage instruction Vd*. In embodiment 3, a so-called alternating voltage is used as the position estimation voltage instruction.

The adder 23d is provided between the output side of the d-axis current controller 14d of the drive voltage instruction calculation section 11, and the first coordinate converter 15. The adder 23d adds the position estimation voltage instruction Vdh outputted from the position estimation voltage generator 12, to the output drive voltage instruction Vd* outputted from the d-axis current controller 14d. Then, a voltage instruction Vdp* that is the resultant signal obtained by the addition, and the drive voltage instruction Vq* outputted from the q-axis current controller 14q are both given to the first coordinate converter 15.

The first coordinate converter 15 converts the instruction signal Vdp* outputted from the adder 23d, and the drive voltage instruction Vq* for q-axis, into the voltage instructions Vα* and Vβ* on two axes (α-β axes) at rest, respectively. The two-phase/three-phase converter 16 converts the voltage instructions Vα* and Vβ* given by the first coordinate converter 15, into the drive voltage instructions Vup*, Vvp*, and Vwp* in a three-phase AC coordinate system, and outputs them to the voltage application means 3.

The position estimation means 4 includes a dm-qm converter 20, two current extractors 6dm and 6qm, the position estimation current amplitude calculation section 7, and the position calculation unit 8.

The dm-qm converter 20 converts the electric rotating machine currents iu, iv, and iw detected by the current detection means 2, into a dm-axis current idm and a qm-axis current iqm in a dm-qm coordinate system different by 45 degrees from the two rotational axes (d-q axes) in synchronization with the estimated position θL outputted from the position calculation unit 8 described later, and outputs the dm-axis current idm and the qm-axis current iqm.

The current extractors 6dm and 6qm extract position estimation currents idmh and iqmh having the same frequency components as that of the position estimation voltage instruction Vdh outputted from the position estimation voltage generator 12, from the dm-axis current idm and the qm-axis current iqm outputted from the dm-qm converter 20, respectively. Specifically, as in embodiment 1, the position estimation currents idmh and iqmh are extracted by using a bandpass filter, or frequency components, of the dm-axis current idm and the qm-axis current iqm, that are the same as that of the position estimation voltage instruction Vdh are attenuated by inputting the dm-axis current idm and the qm-axis current iqm to a notch filter, and the resultant currents that have passed the notch filter are subtracted from the dm-axis current idm and the qm-axis current iqm, respectively, whereby the position estimation currents idmh and iqmh are extracted.

The position estimation current amplitude calculation section 7 calculates position estimation current amplitudes Idmh and Iqmh by using only the squares of the position estimation currents idmh and iqmh given by the current extractors 6dm and 6qm, without using Fourier transform. Specifically, as in the processing by the position estimation current amplitude calculation section 7 of embodiment 1, based on expression (7), multipliers 9*dm* and 9*qm* square the position estimation currents idmh and iqmh to calculate the autocorrelations thereof; integrators 10*dm* and 10*qm* integrate the squared position estimation currents, and multiply the resultant values by (2/Tn); and then square root calculators 22*dm* and 22*qm* calculate the square roots of the resultant values, whereby the position estimation current amplitudes Idmh and Iqmh are calculated, to be outputted.

Figure 9:
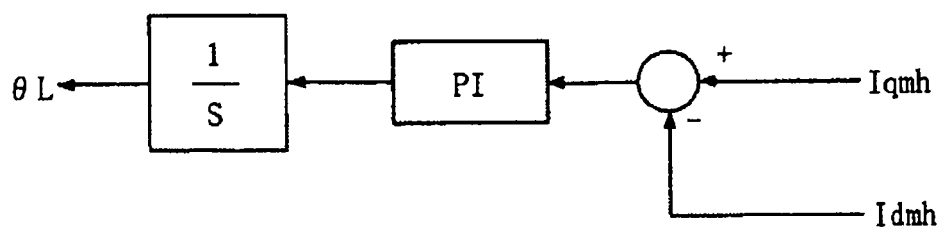
FIG. 9 is a diagram for illustrating the calculation operation of a position calculation unit of the control apparatus.

As shown in FIG. 9, the position calculation unit 8, for example, by using a known technique disclosed in Non-Patent Literature 1 previously described, calculates the deviations of the position estimation current amplitudes Idmh and Iqmh, calculates an estimated speed by performing PI control such that the deviations become zero, indirectly calculates the estimated position θL by integrating the estimated speed, and then outputs the estimated position θL.

As described above, in embodiment 3, the configuration of the position estimation current amplitude calculation section 7 is such that the autocorrelations obtained by squaring the position estimation currents idmh and iqmh are used for calculating the position estimation current amplitudes Idmh and Iqmh. Therefore, it is not necessary to prepare a sine function and a cosine function in advance as in the case of performing Fourier transform. Therefore, the amount of calculation and the memory can be largely reduced.

In addition, in the case of performing Fourier transform, which of the cosine function component and the sine function component is included in the signal whose amplitude has been calculated, and what amount of that component is included in the signal are not known. Therefore, two functions of a cosine function and a sine function need to be used as correlation functions. On the other hand, in embodiment 3, since the position estimation current amplitude calculation section 7 uses autocorrelations, only a signal whose amplitude is to be calculated is needed as a correlation function by which the signal is to be multiplied. Therefore, the number of multiplications can be decreased by 1 in comparison with the case of performing Fourier transform. Also in this respect, the amount of calculation can be reduced in comparison with the case of performing Fourier transform.

It is noted that embodiment 3 may be modified as follows.

That is, although in the position estimation means 4 shown in FIG. 8, the current extractors 6*dm* and 6*qm* are provided at the subsequent stage of the dm-qm converter 20, the order of operations may be reversed as follows. First, the current extractors may extract currents having the same frequency components as that of the position estimation voltage instruction Vdh, from the electric rotating machine currents iu, iv, and iw, and the dm-qm converter 20 at the subsequent stage may convert the extracted currents into currents in the dm-qm coordinate system different by 45 degrees from the two rotational axes rotating in synchronization with the estimated position θL, whereby the position estimation currents idmh and iqmh may be extracted.

Figure 10:
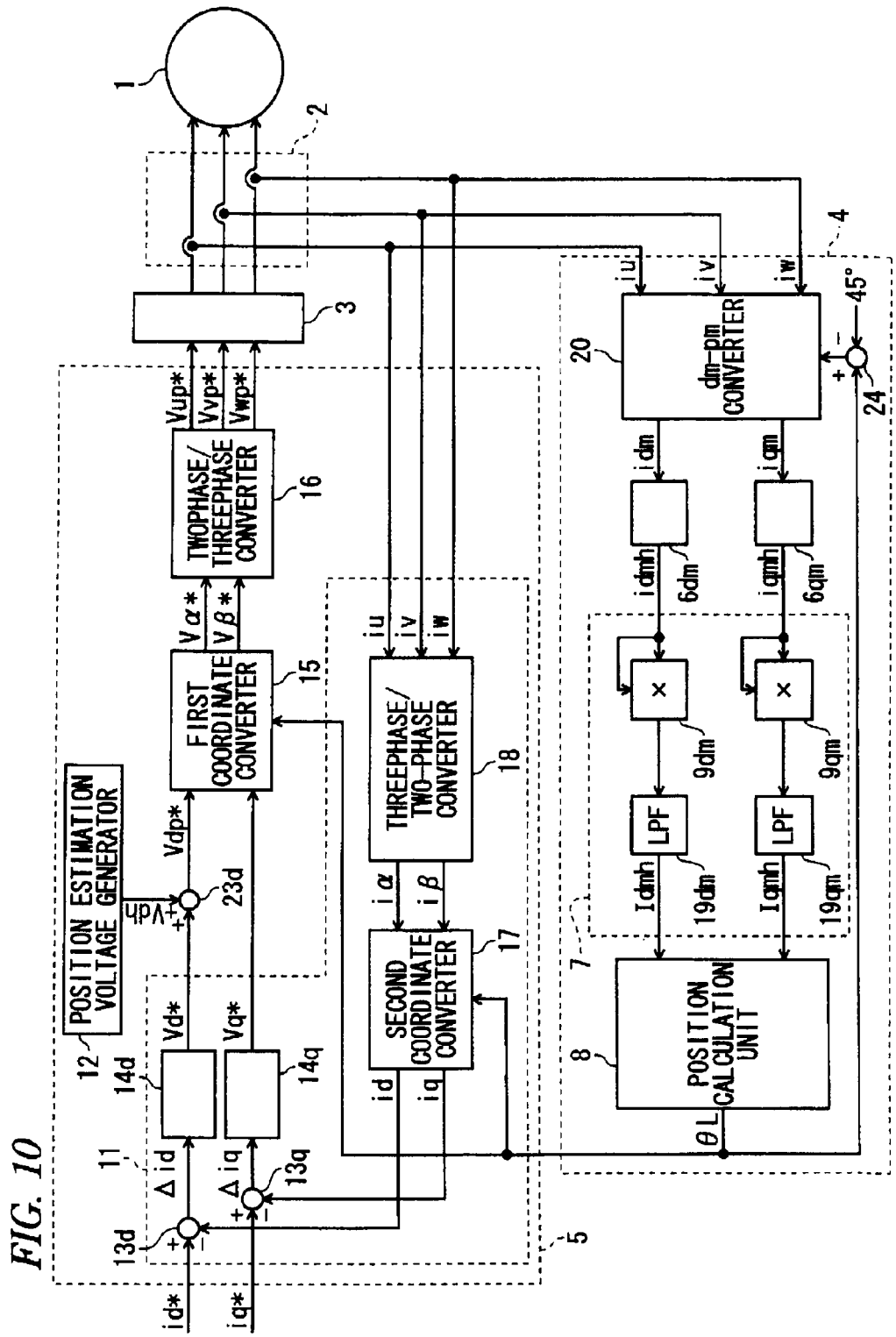
FIG. 10 is a diagram showing a modification of the configuration of the control apparatus for the electric rotating machine, according to embodiment 3 of the present invention.

In addition, as shown in FIG. 10, in the position estimation current amplitude calculation section 7, the multipliers 9*dm* and 9*qm* may square the position estimation currents idmh and iqmh to calculate the autocorrelations thereof, and the squared position estimation currents may be inputted to the low-pass filters 19*dm* and 19*qm*, respectively, whereby the position estimation current amplitudes Idmh and Iqmh may be calculated, as in embodiment 2 (FIG. 6).

Embodiment 4

Figure 11:
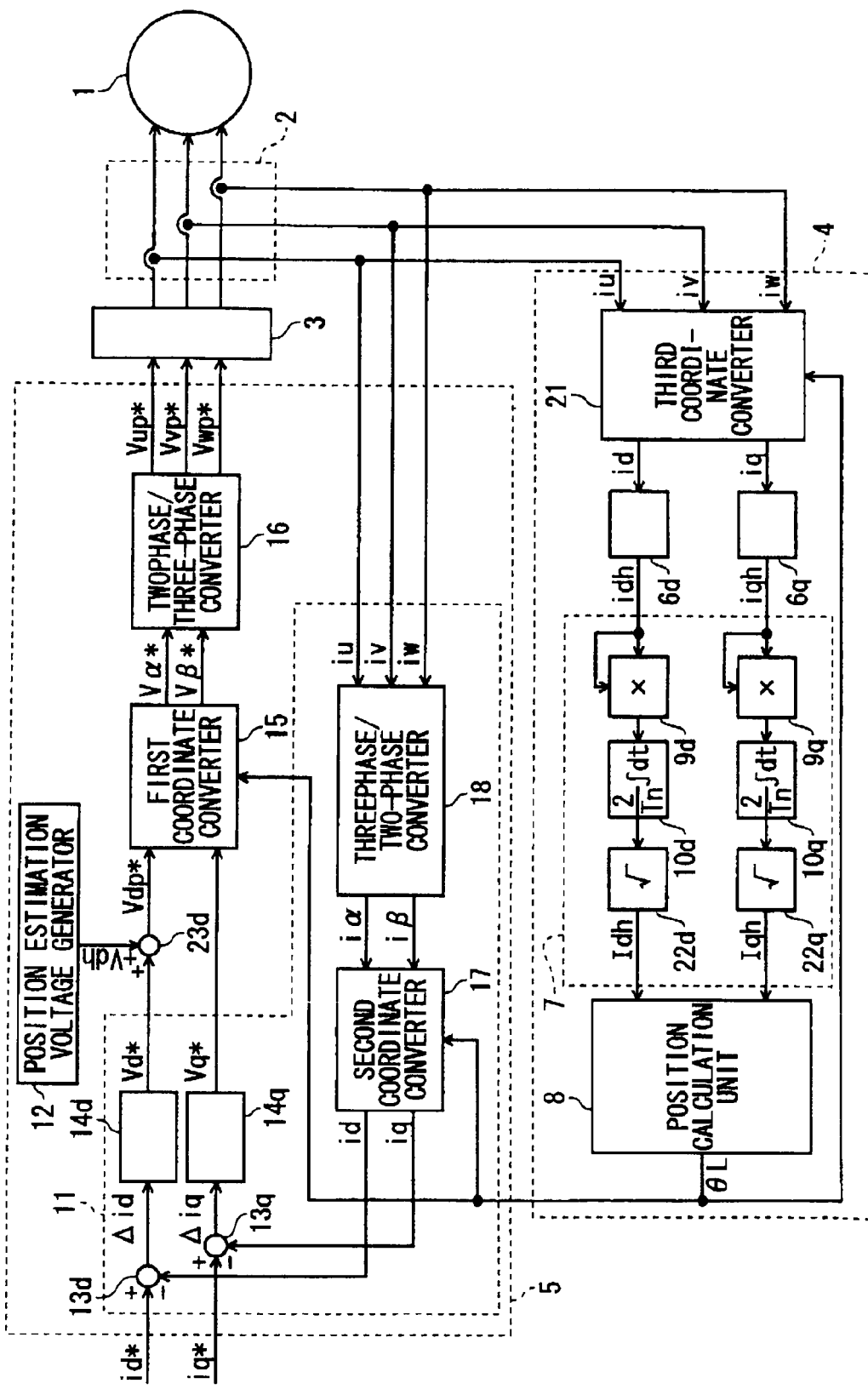
FIG. 11 is a diagram showing the configuration of the control apparatus for the electric rotating machine, according to embodiment 4 of the present invention.

FIG. 11 is a diagram showing the configuration of a control apparatus for the electric rotating machine, according to embodiment 4 of the present invention. Components that correspond to or are the same as those in embodiment 3 shown in FIG. 8 are denoted by the same reference numerals. It is noted that, in FIG. 11, the configurations other than that of the position estimation means 4 are the same as in embodiment 3 (FIG. 8). Therefore, the description of the configurations other than that of the position estimation means 4 will be omitted here.

The position estimation means 4 includes a third coordinate converter 21, two current extractors 6*d* and 6*q*, the position estimation current amplitude calculation section 7, and the position calculation unit 8.

The third coordinate converter 21 converts the electric rotating machine currents iu, iv, and iw detected by the current detection means 2, into the d-axis current id and the q-axis current iq in the d-q coordinate system formed by the two rotational axes rotating in synchronization with the estimated position θL outputted from the position calculation unit 8, and outputs the d-axis current id and the q-axis current iq.

The current extractors 6*d* and 6*q* extract position estimation currents idh and iqh having the same frequency components as that of the position estimation voltage instruction Vdh outputted from the position estimation voltage generator 12, from the currents id and iq outputted from the third coordinate converter 21, respectively. Specifically, as in embodiment 3, the position estimation currents idh and iqh are extracted by using a bandpass filter, or frequency components, of the d-axis current id and the q-axis current iq, that are the same as that of the position estimation voltage instruction Vdh are attenuated by inputting the d-axis current id and the q-axis current iq to a notch filter, and the resultant currents that have passed the notch filter are subtracted from the d-axis current id and the q-axis current iq, respectively, whereby the position estimation currents idh and iqh are extracted.

The position estimation current amplitude calculation section 7 calculates position estimation current amplitudes Idh and Iqh by using only the squares of the position estimation currents idh and iqh given by the current extractors 6*d* and 6*q*, without using Fourier transform. Specifically, as in the processing by the position estimation current amplitude calculation section 7 of embodiment 1 or 3, based on expression (7), multipliers 9*d* and 9*q* square the position estimation currents idh and iqh to calculate the autocorrelations thereof; integrators 10*d* and 10*q* integrate the squared position estimation currents, and multiply the resultant values by (2/Tn); and then square root calculators 22*d* and 22*q* calculate the square roots of the resultant values, whereby the position estimation current amplitudes Idh and Iqh are calculated, to be outputted.

The position calculation unit 8 outputs the estimated position θL by using a known technique (for example, technique disclosed in Patent Publication No. 3312472). That is, in the case where the adder 23*d* adds the position estimation voltage instruction Vdh (Vdh=Vh sin ωht) outputted from the position estimation voltage generator 12, to the d-axis voltage instruction Vd*, the equation of state of the position estimation currents idh and iqh obtained by the current extractors 6*d* and 6*q* is represented by expression (15).

[Expression 15]

$$P\begin{bmatrix} idh \\ iqh \end{bmatrix} = \frac{1}{\Delta}\begin{bmatrix} Lo - L2 \cdot \cos 2\theta \\ L2 \cdot \sin 2\theta \end{bmatrix} \cdot Vh \cdot \sin \omega_h t \quad (15)$$

(where $\Delta = Lo^2 - L2^2 \cdot \cos 4\theta$)

Integration of both sides of the expression (15) obtains expression (16).

[Expression 16]

$$\begin{bmatrix} idh \\ iqh \end{bmatrix} = -\frac{Vh}{\omega_h \cdot \Delta}\begin{bmatrix} Lo - L2 \cdot \cos 2\theta \\ L2 \cdot \sin 2\theta \end{bmatrix} \cos \omega_h t \quad (16)$$

Therefore, the position estimation current amplitudes Idh and Iqh outputted from the position estimation current amplitude calculation section 7 are represented by expression (17).

[Expression 17]

$$Idh = -\frac{Vh}{\omega_h \cdot \Delta}(Lo - L2 \cdot \cos 2\theta) \quad (17)$$

$$Iqh = -\frac{Vh \cdot L2}{\omega_h \cdot \Delta}\sin 2\theta$$

Here, expression (17) includes position information θ of the electric rotating machine 1. Therefore, the position of the rotary electric machine 1 can be estimated by using the position estimation current amplitudes Idh and Iqh. For example, when the estimated position θL is to be calculated by using the position estimation current amplitude Iqh, if Lo and L2 are known, $Lo^2 \gg L2^2$ is assumed, and Δ is defined as $\Delta = Lo^2$, the estimated position θL of the electric rotating machine 1 can be calculated by dividing the position estimation current amplitude Iqh by $\{-Vh \cdot L2/(\omega h \cdot Lo^2)\}$, and multiplying the inverse sine of the resultant value by ½.

[Expression 18]

$$\theta L = \frac{\sin^{-1}\left(Iqh \cdot \frac{\omega_h \cdot Lo^2}{Vh \cdot L2}\right)}{2} \quad (18)$$

As described above, in embodiment 4, the configuration of the position estimation current amplitude calculation section 7 is such that the autocorrelations obtained by squaring the position estimation currents idh and iqh are used for calculating the position estimation current amplitudes Idh and Iqh. Therefore, it is not necessary to prepare a sine function and a cosine function in advance as in the case of performing Fourier transform. Therefore, the amount of calculation and the memory can be largely reduced.

In addition, in the case of performing Fourier transform, which of the cosine function component and the sine function component is included in the signal whose amplitude has been calculated, and what amount of that component is included in the signal are not known. Therefore, two functions of a cosine function and a sine function need to be used as correlation functions. On the other hand, in embodiment 4, since the position estimation current amplitude calculation section 7 uses autocorrelations, only a signal whose amplitude is to be calculated is needed as a correlation function by which the signal is to be multiplied. Therefore, the number of multiplications can be decreased by 1 in comparison with the case of performing Fourier transform. Also in this respect, the amount of calculation can be reduced in comparison with the case of performing Fourier transform.

It is noted that embodiment 4 may be modified as follows. That is, although in the position estimation means 4 shown in FIG. 11, the current extractors 6d and 6q are provided at the subsequent stage of the third coordinate converter 21, the order of operations may be reversed as follows. First, the current extractors may extract currents having the same frequency components as that of the position estimation voltage instruction Vdh, from the electric rotating machine currents iu, iv, and iw, and the third coordinate converter 21 at the subsequent stage may convert the extracted currents into currents in the d-q coordinate system formed by the two rotational axes rotating in synchronization with the estimated position θL, whereby the position estimation currents idh and iqh may be extracted. Here, the d-axis current id and the q-axis current iq outputted from the second coordinate converter 17 of the control means 5 may be used as the d-axis current id and the q-axis current iq to be inputted to the current extractors 6d and 6q. In this case, the third coordinate converter 21 can be omitted.

Figure 12:
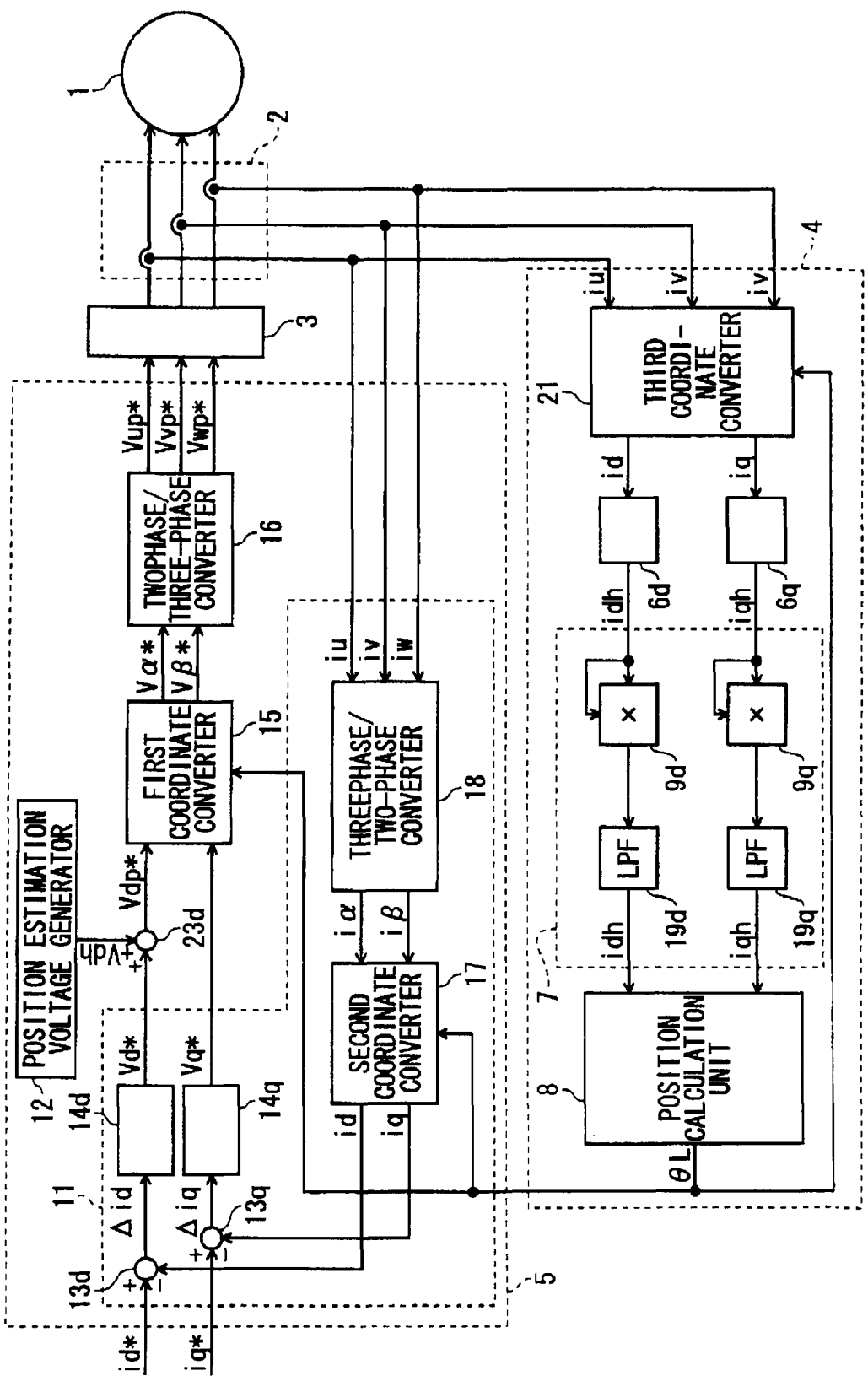
FIG. 12 is a diagram showing a modification of the configuration of the control apparatus for the electric rotating machine, according to embodiment 4 of the present invention.

In addition, as shown in FIG. 12, in the position estimation current amplitude calculation section 7, the multipliers 9d and 9q may square the position estimation currents idh and iqh to calculate the autocorrelations thereof, and the squared position estimation currents may be inputted to the low-pass filters 19d and 19q, respectively, whereby the position estimation current amplitudes Idh and Iqh may be calculated, as in embodiment 2 (FIG. 6).

INDUSTRIAL APPLICABILITY

In embodiments 1 to 4, a synchronous machine of embedded-magnet type is used as the electric rotating machine 1. However, the present invention is not limited thereto. The present invention is also applicable to synchronous machines of other types such as synchronous-reluctance type, whereby it becomes possible to perform rotation control in which rotor position information is accurately detected, without using a rotational position sensor and without performing Fourier transform.

The invention claimed is:

1. A control apparatus for an electric rotating machine that performs drive control of the electric rotating machine, the control apparatus comprising:
   a current detection means for detecting electric rotating machine currents flowing in the electric rotating machine;
   a position estimation means for estimating the position of a rotor of the electric rotating machine, based on the electric rotating machine currents detected by the current detection means;
   a control means for outputting voltage instructions, based on the electric rotating machine currents detected by the current detection means and information about the position of the rotor estimated by the position estimation means; and
   a voltage application means for applying a voltage for drive control, to the electric rotating machine, based on the voltage instructions outputted from the control means;
   the control means including a drive voltage instruction calculation section for calculating drive voltage instructions for driving the electric rotating machine, the control means including a position estimation voltage generator for outputting position estimation voltage instructions for estimating the position of the rotor of the electric rotating machine, and the control means including adders for adding the position estimation voltage instructions to the drive voltage instructions, and outputting the resultant signals as the voltage instructions to the voltage application means;

the position estimation means including current extractors for extracting position estimation currents having the same frequency components as those of the position estimation voltage instructions included in the electric rotating machine currents detected by the current detection means, the position estimation means including a position estimation current amplitude calculation section for calculating position estimation current amplitudes, based on the position estimation currents extracted by the current extractors, and the position estimation means including a position calculation unit for performing estimation calculation of the position of the rotor of the electric rotating machine, based on the position estimation current amplitudes calculated by the position estimation current amplitude calculation section; and the position estimation current amplitude calculation section calculating the position estimation current amplitudes by integrating the squares of the position estimation currents over an interval no less than a half period of the position estimation currents.

2. The control apparatus for the electric rotating machine according to claim 1, wherein:

the position estimation current amplitude calculation section integrates the squares of the position estimation currents over the interval no less than a half period of the position estimation currents, and calculates the square root of the value obtained by dividing the integrated value by a half of the integration interval, whereby the position estimation current amplitudes can be calculated.

3. The control apparatus for the electric rotating machine according to claim 1, wherein:

the position estimation voltage generator generates three-phase equilibrium position estimation voltage instructions.

4. The control apparatus for the electric rotating machine according to claim 1, wherein:

the position estimation voltage generator generates the position estimation voltage instructions in a d-axis direction of a d-q orthogonal coordinate system rotating in synchronization with the rotor of the electric rotating machine or a magnetic flux vector, the position estimation means includes a dm-qm converter for performing coordinate conversion for the electric rotating machine currents detected by the current detection means, to obtain a dm-axis current and a qm-axis current in a dm-qm coordinate system different by 45 degrees from the d-q orthogonal coordinate system, and the current extractors extract the position estimation currents having the same frequency components as those of the position estimation voltage instructions, based on the dm-axis current and the qm-axis current obtained by the coordinate conversion by the dm-qm converter.

5. The control apparatus for the electric rotating machine according to claim 1, wherein:

the position estimation voltage generator generates the position estimation voltage instructions that is an alternating voltage, the position estimation means includes a coordinate converter for performing coordinate conversion for the electric rotating machine currents detected by the current detection means, to obtain a parallel component current that is a component parallel to the position estimation voltage instructions, and an orthogonal component current that is a component orthogonal to the position estimation voltage instructions, and the current extractors extract the position estimation currents having the same frequency components as those of the position estimation voltage instructions, based on the parallel component current and the orthogonal component current obtained by the coordinate conversion by the coordinate converter.

6. A control method for performing drive control of an electric rotating machine, the method comprising:

a step of adding position estimation voltage instructions for estimating the position of a rotor of the electric rotating machine, to drive voltage instructions for driving the electric rotating machine;

a step of detecting electric rotating machine currents flowing in the electric rotating machine along with the driving of the electric rotating machine, based on signals obtained by the addition;

a step of extracting position estimation currents having the same frequency components as those of the position estimation voltage instructions included in the detected electric rotating machine currents;

a step of calculating position estimation current amplitudes by integrating the squares of the extracted position estimation currents over an interval no less than an m multiple (m is a positive integer) of a half period of the position estimation currents;

a step of performing estimation calculation of the position of the rotor of the electric rotating machine, based on the calculated position estimation current amplitudes; and a step of performing feedback correction for the drive voltage instructions, based on information about the estimated position of the rotor, and the values of the electric rotating machine currents.

7. A control apparatus for an electric rotating machine that performs drive control of the electric rotating machine, the control apparatus comprising:

a current detection means for detecting electric rotating machine currents flowing in the electric rotating machine;

a position estimation means for estimating the position of a rotor of the electric rotating machine, based on the electric rotating machine currents detected by the current detection means;

a control means for outputting voltage instructions, based on the electric rotating machine currents detected by the current detection means and information about the position of the rotor estimated by the position estimation means; and a voltage application means for applying a voltage for drive control, to the electric rotating machine, based on the voltage instructions outputted from the control means;

the control means including a drive voltage instruction calculation section for calculating drive voltage instructions for driving the electric rotating machine, the control means including a position estimation voltage generator for outputting position estimation voltage instructions for estimating the position of the rotor of the electric rotating machine, and the control means including adders for adding the position estimation voltage instructions to the drive voltage instructions, and outputting the resultant signals as the voltage instructions to the voltage application means;

the position estimation means including current extractors for extracting position estimation currents having the same frequency components as those of the position estimation voltage instructions included in the electric rotating machine currents detected by the current detection means, the position estimation means including a position estimation current amplitude calculation section for calculating position estimation current amplitudes, based on the position estimation currents extracted by the current extractors, and the position estimation means including a position calculation unit for performing estimation calculation of the position of the rotor of the electric rotating machine, based on the position estimation current amplitudes calculated by the position estimation current amplitude calculation section;

the position estimation voltage generator generates the position estimation voltage instructions having frequencies at least no less than two sorts in order to estimate the position of the rotor of the electric rotating machine;

the position estimation current amplitude calculation section calculates the position estimation current amplitudes, based on signals that has passed low-pass filters which allow low-frequency components of the squares of the position estimation currents to pass.

8. The control apparatus for the electric rotating machine according to claim 7, wherein:

cutoff frequencies of the low-pass filters of the position estimation current amplitude calculation section are no more than frequencies of the position estimation currents, and no less than two multiple of frequencies of the drive voltage instructions.

* * * * *